United States Patent
Lee et al.

(10) Patent No.: US 11,910,191 B2
(45) Date of Patent: *Feb. 20, 2024

(54) EFFICIENT POLICY ENFORCEMENT USING NETWORK TOKENS FOR SERVICES—USER-PLANE APPROACH

(71) Applicant: QUALCOMM Incorporated, San Diego, CA (US)

(72) Inventors: Soo Bum Lee, San Diego, CA (US); Gavin Bernard Horn, La Jolla, CA (US); John Wallace Nasielski, San Diego, CA (US); Stefano Faccin, San Ysidro, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/992,842

(22) Filed: Nov. 22, 2022

(65) Prior Publication Data

US 2023/0091356 A1 Mar. 23, 2023

Related U.S. Application Data

(63) Continuation of application No. 17/586,509, filed on Jan. 27, 2022, now Pat. No. 11,570,622, which is a
(Continued)

(51) Int. Cl.
*H04L 47/20* (2022.01)
*H04W 12/069* (2021.01)
(Continued)

(52) U.S. Cl.
CPC ........... *H04W 12/069* (2021.01); *H04L 47/20* (2013.01); *H04L 47/22* (2013.01); *H04L 63/08* (2013.01);
(Continued)

(58) Field of Classification Search
CPC .............................. H04L 12/813; H04L 12/08
See application file for complete search history.

(56) References Cited

U.S. PATENT DOCUMENTS

| 7,990,998 | B2 | 8/2011 | Prakash et al. |
| 8,621,590 | B2 | 12/2013 | Hoggan |

(Continued)

FOREIGN PATENT DOCUMENTS

| CA | 2423705 A1 | 5/2001 |
| CN | 102469020 A | 5/2012 |

(Continued)

OTHER PUBLICATIONS

Ericsson, et al., "More Details on Fast Path Security Protocol" [online], 3GPP TSG SA WG3 (Security) Meeting #72, S3-130778, Qingdao, China, Jul. 8-12, 2013, Jul. 1, 2013, [Searched on Aug. 11, 2020], 11 pages, Retrieved from the Internet: URL:https://www.3gpp.org/ftp/tsg_sa/WG3_Security/TSGS3_72_Qingdao/Docs/S3-130778.zip.

(Continued)

*Primary Examiner* — Sulaiman Nooristany
(74) *Attorney, Agent, or Firm* — Loza & Loza, LLP

(57) ABSTRACT

One aspect relates to initiating, by a device, a connection with an application server associated with one or more application services. A gateway derives an uplink network token and/or a downlink network token. The tokens are provisioned to the device and/or an application server over the user-plane. The tokens are included with uplink and/or downlink packets, respectively. Another aspect relates to receiving a data packet at a gateway. The gateway determines a requirement for a network token from the packet. The gateway derives the network token based on a device subscription profile maintained by a network. The network token may be sent with the packet to a destination address associated with the packet. A packet including a network
(Continued)

token may be received at a gateway. The gateway may verify the network token and send the data packet to an application server or a device if the verifying is successful.

17 Claims, 21 Drawing Sheets

Related U.S. Application Data continuation of application No. 16/519,459, filed on Jul. 23, 2019, now Pat. No. 11,265,712, which is a continuation of application No. 14/866,425, filed on Sep. 25, 2015, now Pat. No. 10,505,850.

(60) Provisional application No. 62/161,768, filed on May 14, 2015, provisional application No. 62/120,159, filed on Feb. 24, 2015.

(51) Int. Cl.
*H04L 47/22* (2022.01)
*H04L 67/146* (2022.01)
*H04L 9/40* (2022.01)
*H04W 12/084* (2021.01)
*H04W 12/088* (2021.01)

(52) U.S. Cl.
CPC ......... *H04L 67/146* (2013.01); *H04W 12/084* (2021.01); *H04W 12/088* (2021.01); *H04L 63/02* (2013.01); *H04L 63/0428* (2013.01)

(56) References Cited

U.S. PATENT DOCUMENTS

| | | | |
|---|---|---|---|
| 8,949,978 | B1 | 2/2015 | Lin et al. |
| 10,362,011 | B2 | 7/2019 | Lee et al. |
| 10,505,850 | B2 | 12/2019 | Lee et al. |
| 11,265,712 | B2 | 3/2022 | Lee et al. |
| 2002/0036983 | A1 | 3/2002 | Widegren et al. |
| 2002/0099727 | A1* | 7/2002 | Kadyk .................... G06F 9/546 |
| 2005/0053070 | A1 | 3/2005 | Jouppi |
| 2008/0062986 | A1 | 3/2008 | Shand et al. |
| 2008/0076425 | A1 | 3/2008 | Khetawat et al. |
| 2008/0127320 | A1 | 5/2008 | De Lutiis et al. |
| 2009/0067628 | A1 | 3/2009 | Pudney et al. |
| 2009/0119770 | A1 | 5/2009 | Soliman et al. |
| 2009/0193129 | A1 | 7/2009 | Agarwal et al. |
| 2009/0199001 | A1 | 8/2009 | Barriga et al. |
| 2010/0104103 | A1 | 4/2010 | Guo et al. |
| 2010/0306547 | A1 | 12/2010 | Fallows et al. |
| 2011/0058474 | A1 | 3/2011 | Nagapudi et al. |
| 2011/0131417 | A1 | 6/2011 | Swander et al. |
| 2011/0171953 | A1 | 7/2011 | Faccin et al. |
| 2011/0185039 | A1 | 7/2011 | Ueno et al. |
| 2012/0106338 | A1 | 5/2012 | Pongracz et al. |
| 2012/0240211 | A1 | 9/2012 | Counterman |
| 2012/0323990 | A1* | 12/2012 | Hayworth ........... H04L 67/1095 709/203 |
| 2013/0064104 | A1 | 3/2013 | Bekiares et al. |
| 2013/0078950 | A1 | 3/2013 | Liao |
| 2013/0139241 | A1 | 5/2013 | Leeder |
| 2013/0155948 | A1* | 6/2013 | Pinheiro ............... H04W 76/10 370/328 |
| 2013/0326368 | A1 | 12/2013 | Voas et al. |
| 2014/0086177 | A1 | 3/2014 | Adjakple et al. |
| 2014/0331060 | A1 | 11/2014 | Hayton |
| 2015/0082025 | A1* | 3/2015 | Deshpande ......... H04W 12/069 713/155 |
| 2015/0264739 | A1 | 9/2015 | Hurtta |
| 2016/0197831 | A1 | 7/2016 | De Foy et al. |
| 2016/0248682 | A1 | 8/2016 | Lee et al. |
| 2016/0294803 | A1 | 10/2016 | Reddy et al. |
| 2017/0012956 | A1 | 1/2017 | Lee et al. |
| 2019/0349306 | A1 | 11/2019 | Lee et al. |
| 2022/0150699 | A1 | 5/2022 | Lee et al. |

FOREIGN PATENT DOCUMENTS

| | | |
|---|---|---|
| CN | 102625271 A | 8/2012 |
| JP | H07307752 A | 11/1995 |
| JP | 2011155545 A | 8/2011 |
| JP | 2012511846 A | 5/2012 |
| WO | WO-2006045402 A1 | 5/2006 |
| WO | WO-2006069398 | 6/2006 |
| WO | WO-2013128470 A1 | 9/2013 |
| WO | WO-2014056523 A1 | 4/2014 |
| WO | WO-2014139998 A1 | 9/2014 |
| WO | WO-2015023537 A2 | 2/2015 |

OTHER PUBLICATIONS

International Preliminary Report on Patentability—PCT/US2016/013463, The International Bureau of WIPO—Geneva, Switzerland, dated Jun. 7, 2017.
International Search Report and Written Opinion—PCT/US2016/013463—ISA/EPO—dated Sep. 28, 2016.
Jones M., et al., "The OAuth 2.0 Authorization Framework: Bearer Token Usage, rfc6750.txt", Oct. 13, 2012, XP015086449, pp. 1-18.
Taiwan Search Report—TW105101139—TIPO—dated Mar. 18, 2019.
Wikipedia: "Message Authentication Code—Wikipedia—Version of Dec. 26, 2014", Dec. 26, 2014, XP055838022, pp. 1-5.
Yaar A., et al., "SIFF: A Stateless Internet Flow Filter to Mitigate DDoS Flooding Attacks, Security and Privacy," IEEE Symposium, 2004, pp. 130-143.
Yang X., et al., A DoSlimiting Network Architecture, SIGCOMM '05, Aug. 21-26, 2005, 12 pages, Philadelphia, Pennsylvania, USA, Copyright 2005.
Anonymous: "OAuth", Wikipedia, Version of Feb. 19, 2015, XP093089626, 8 Pages, Feb. 19, 2015.
Hardt D., et al., "The OAuth 2.0 Authorization Framework", rfc6749.txt, Internet Engineering Task Force (IETF), Request for Comments: 6749, Category: Standards Track, Oct. 13, 2012, pp. 1-76, XP015086448.
Popov A., et al., "The Token Binding Protocol Version 1.0", draft-popov-token-binding-00, Oct. 13, 2014, XP015102131, pp. 1-13.

* cited by examiner

EFFICIENT POLICY ENFORCEMENT USING NETWORK TOKENS FOR SERVICES—USER-PLANE APPROACH

This application is a continuation of and claims priority to U.S. patent application Ser. No. 17/586,509, filed Jan. 27, 2022, titled Efficient Policy Enforcement Using Network Tokens For Services-User-Plane Approach, which is a continuation of and claims priority to U.S. patent application Ser. No. 16/519,459, filed Jul. 23, 2019 (now U.S. Pat. No. 11,265,712), titled Efficient Policy Enforcement Using Network Tokens For Services-User-Plane Approach, which is a continuation of and claims priority to U.S. patent application Ser. No. 14/866,425, filed Sep. 25, 2015 (now U.S. Pat. No. 10,505,850) titled Efficient Policy Enforcement Using Network Tokens For Services-User-Plane Approach and claims priority to U.S. Provisional Application No. 62/120,159, filed Feb. 24, 2015, titled Efficient Policy Enforcement Using Network Tokens For Services U-Plane Approach and claims priority to U.S. Provisional Application No. 62/161,768, filed May 14, 2015, titled Efficient Policy Enforcement Using Network Tokens-U-Plane Approach, the contents of these applications are incorporated by reference herein.

FIELD

One aspect generally relates to network tokens, and more specifically to the derivation, provisioning, and use of uplink and down ink network tokens that are associated with uplink and downlink user-plane data flows to facilitate enforcement of network policies verifying that a device is accessing only authorized application services) and/or packet steering.

BACKGROUND

Some client devices may have network access, hut their network access may be limited to a set of application services. Network operators may use policies to impose such limitations. In one example, a particular application service provider may sponsor network access of a client device. The client device may be limited to application services run by the application service provider on its server. In another example, a client device with network access may be part of a contract that allows for special charging or handling of data (e.g., bit rate or quality of service) associated with a given application service. For example, a client device may have a cellular subscription through a cellular provider and that cellular provider may wish to impose one or more restrictions on the client device. In one example, a corporation that is today known as a provider of social media, but not known as a cellular provider, may play a role as a cellular provider in the future. In this example, the client device may have a subscription with the corporation. As part of its subscription agreement, the client device may gain access to the Internet but may be restricted to use the social media site of the corporation to the exclusion of other social media sites. By way of another example, a client device may have a subscription with a provider of streaming media services. In this example, as part of an agreement, the client device may gain access to the Internet through various cellular providers (e.g., mobile network operators). However, access may be restricted by agreement (between the provider of streaming media services and the various cellular providers and/or the user of the client device) to use the site of the provider of media services for all streaming media services. By way of another example, for certain access point names (APNs), only certain traffic (e.g., control-plane signaling and/or user-plane messages) may be allowed to be sent from a client device based on a policy or subscription limitation.

Network policies may be instituted in connection with application services to ensure that a client device is not violating any agreements, is being provided access to agreed upon application services, and/or is being provided with an agreed upon level of service. A network may enforce such policies against uplink (UL) packets sent from a client device toward, for example, an application server on a packet data network e.g., the Internet). A network may additionally enforce such policies against downlink (DL) packets sent from the application server toward the client device.

Today, policy enforcement for application services occurs at a gateway to a network. An example of such a gateway is a packet data network gateway (P-GW), which serves as a gateway between a core network (e.g., evolved packet core (EPC)) and a packet data network (PDN), such as the Internet. One problem exists in that policy enforcement (e.g., enforcement of service access policies) may require a P-GW to validate all UL and DL packets sent between a client device and application servers. Moreover, each UL packet and DL packet may need to be steered to its destination address via a particular bearer or data flow. A destination address may be comprised of two parts: a prefix part and a suffix part.

Network policies may be enforced by validation of UL and DL packets at the P-GW. Enforcement may ensure that a client device is only sending/receiving packets to/from an authorized application service. Validation may include verifying the destination address or the destination address and the port number of packets passing through the P-GW. Validation may additionally include verifying the source address of each packet. Verifying the source address of each packet may be useful for anti-spoofing (e.g., by preventing packets from unauthorized client devices from fooling a network by appearing to come from an authorized client device). Packet steering may be needed to ensure that an agreed upon quality of service (QoS) is achieved.

Current practices incur substantial overhead and add forwarding latency due to processing delay. The current practice is typically realized using packet inspection (e.g., deep packet inspection, shallow packet inspection) and traffic flow template (TFT) and service data flow (SDF) templates. The P-GW confirms that the packets conform to a TFT/SDF template defined for the service(s) by inspecting the headers of each packet.

FIG. 1 is a prior art illustration of a role of an SDF template 102 in detecting a downlink part of a service data flow 104 and mapping that part to bearers, such as the Internet Protocol-Connectivity Access Network (IP-CAN) bearers 106 shown, FIG. 1 is based on 3GPP technical specification (TS) 23.203, figure 6.4.

An SDF template 102 is created to validate and map downlink packets. However, use of the set of packet filters (see, e.g., packet filters a-f in the SDF template 102) requires the use of tables and table lookup procedures. Use of such tables and procedures affects efficiency in that the use requires memory storage space and processor resources to execute the procedures. Additionally, time resources are wasted in that each packet must be filtered through a plurality of filters before any given packet is applied to a filter that meets all of the requirements of the filter.

Using packet inspection and TFT/SDF templates at the P-GW (for either or both of uplink and downlink packets) is therefore problematic, for example, because their use incurs substantial overhead (e.g., processing and memory resources for memory lookup and pattern matching) and adds forwarding latency due to processing delay. Additionally, fine-grain policy control (e.g., per service) is difficult because additional policy control would incur additional overhead and processing delay because a packet would need to be tested against additional filtering rules realized by TFT/SDF templates. Furthermore, use of TFT/SDF templates is not scalable for sponsored connectivity. An increase in the number of sponsors of different services (perhaps thousands of services in the years to come) would mean an increase in the time needed to filter packets through a correspondingly increased number of TFT/SDF templates. This, again, would incur additional overhead and processing delay.

What is required is an alternative to supplement and/or enhance packet inspection and to improve efficiency in enforcement of uplink and downlink network policies.

SUMMARY

According to a first aspect, a method may be operational at a device. The method may include initiating, by the device, a connection with an application server associated with one or more application services. In response to initiating the connection, the device may obtain a network token. The network token may be associated with a first flow of a set of one or more flows, associated with a first application service of the one or more application services, and provisioned to the device via one or more user-plane messages. The method may also include sending the network token with one or more uplink (UL) packets from the device to the application server in the user-plane.

According to additional aspects, the network token may be obtained from one of the application server and/or a gateway device. The network token may be derived by a gateway device of a core network. It may be based on a device subscription profile of the device and/or a policy of the first application service. It may reflect a policy enforced by a core network with respect to the device. The aspect of initiating the connection may include sending a connection request and the connection request includes an explicit request for the network token. It may include sending a packet representative of an implicit request for the network token.

According to some aspects, the implicit request may be represented by sending a first packet to the application server. Initiating the connection may include sending a packet that requires an acknowledgment from the application server, wherein the acknowledgment transports the network token to the device. The network token may be transported from the device to a packet data network (PDN) gateway (P-GW) in a user-plane shim header. The user-plane shim header may be located above an Internet Protocol (IP) layer. The network token may be transported from the device to a packet data network (PDN) gateway (P-GW) in an Internet Protocol (IP) extension header as defined in IP version 6 (IPv6). It may be transported from the device to an access node in a packet data convergence protocol (PDCP) layer, copied to a general packet radio service (GPRS) tunneling protocol (GTP) layer for a user-plane (GTP-U) layer in the access node, and transported from the access node to a packet data network (PDN) gateway (P-GW) in the GTP-U layer.

According to one aspect, a device including a network communication interface configured to communicate over a wireless network and a processing circuit coupled to the network communication interface may perform the method described above.

According to another aspect, a method may be operational at a gateway device in a network. The method may include receiving, at the gateway device, over a user-plane, a first data packet. The method may further include determining if a network token is requested by evaluating the first data packet and obtaining the network token if the network token is requested. The network token may be based on a device subscription profile maintained by the network. The method may further entail including the network token with the first data packet if the network token is requested; and sending the first data packet and network token to a destination.

According to additional aspects, the first data packet may be sent to an application server and the network token is an uplink network token. The first data packet may be sent to an application server and the network token is a downlink network token. The first data packet may be sent to a device and the network token is a downlink network token. If the first data packet is sent to a device and the network token is a downlink network token, the method may further include receiving, at the gateway device, a second data packet inducing the downlink network token from the device, and sending the second data packet and the downlink network token to an application server. According to some aspects the network token is an uplink network token and a downlink network token, the uplink network token being different from the downlink network token. The gateway device may be a packet data network (PDN) gateway (P-GW). The first packet may include an explicit request for the network token or it may be representative of an implicit request for the network token. According to some aspects, determining if the network token is requested may be based on determining if an application server to which the first packet is to be sent, or from which the first packet is received, requires the network token.

Obtaining the network token may be achieved by deriving the network token at the gateway device. The network token may be derived using a function having a set of input parameters including a secret key known to the gateway device, a class index, a source Internet Protocol (IP) address, source port number, destination IP address, destination port number, protocol identifier (ID), application ID, priority, and/or a quality of service class identifier (QCI). The class index defines fields used for network token derivation. The network token may be a concatenation of the class index and an output of the function.

According to one aspect, a gateway device including a network communication interface configured to communicate over a wireless network and a processing circuit coupled to the network communication interface may perform the method described above.

According to another aspect, a method operational at a gateway device may include deriving, at the gateway device, a first network token in response to a request for the first network token sent from a device to an application server associated with one or more application services. The method may include receiving, at the gateway device, a data packet from the device, the data packet including at least a destination address prefix that corresponds to the application server and the data packet including a second network token. The method may further include verifying the second network token, discarding the data packet if the verifying is not successful, and sending the data packet to the application server if the verifying is successful. The data packet may be received in a user-plane message. The gateway device may be a packet data network (PDN) gateway (P-GW). Verifying the second network token may include deriving a duplicate of the first network token from a first function using input parameters obtained from the data packet and a key known to the gateway device. Verifying the second network token may further include comparing the duplicate of the first network token to the second network token, wherein verification is successful if the duplicate of the first network token is equal to the second network token.

According to some aspects, the second network token may be transported from the device to the gateway device in a shim header, separate from an IP header. The second network token may be transported from the device to the gateway device in an IP extension header defined in Internet Protocol (IP) version 6 (IPv6). According to some aspects, the second network token may be transported from the device to an access node in a packet data convergence protocol (PDCP) layer, copied to a general packet radio service (GPRS) tunneling protocol (GTP) layer for a user-plane (GTP-U) layer in the access node, and transported from the access node to the gateway device in the GTP-U layer.

According to one aspect, a gateway device including a network communication interface configured to communicate over a wireless network and a processing circuit coupled to the network communication interface may perform the method described above.

According to another aspect, a method, operational at an application server, may include sending, by the application server associated with one or more application services, a request to initiate a first application service with a device. The method may further include obtaining, in response to sending the request to initiate the first application service, a network token. The network token may be associated with a first flow of a set of one or more flows, associated with the first application service, and sent to the device via one or more user-plane messages. The method may further include sending the network token with one or more downlink (DL) packets sent from the application server to the device in the user-plane. The network token may be derived by a gateway device of a core network. It may be based on a device subscription profile of the device and/or a policy of the first application service. It may reflect a policy enforced by a core network with respect to the device. The request to initiate the first application service may include an explicit request for the network token or it may include sending a packet representative of an implicit request for the network token.

According to one aspect, an application server including a network communication interface configured to communicate over a wireless network and a processing circuit coupled to the network communication interface may perform the method described above.

DRAWINGS

DETAILED DESCRIPTION

Figure 1:
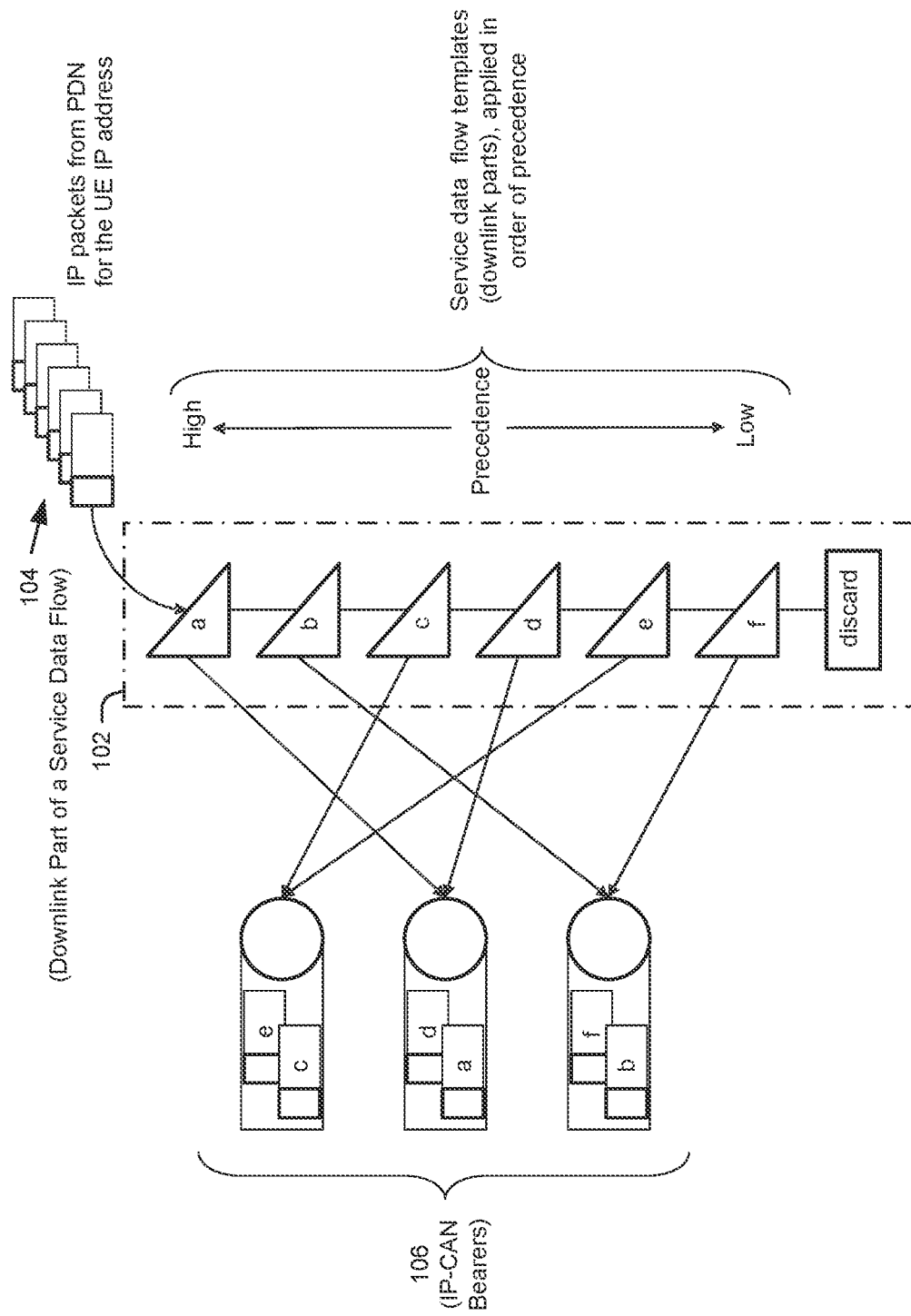
FIG. 1 is a prior art illustration of a role of an SDF template in detecting a downlink part of a service data flow and mapping that part to bearers, such as the Internet Protocol-Connectivity Access Network (IP-CAN) bearers shown.

In the following description, reference is made to the accompanying drawings in which is shown, by way of illustration, specific embodiments in which the disclosure may be practiced. The embodiments are intended to describe aspects of the disclosure in sufficient detail to enable those skilled in the art to practice the invention. Other embodiments may be utilized and changes may be made to the disclosed embodiments without departing from the scope of the disclosure. The following detailed description is not to be taken in a limiting sense, and the scope of the present invention is defined only by the appended claims.

The term "device" may be used herein to refer to a chip component and/or a client device, such as a mobile device, mobile phone, mobile communication device, mobile computing device, digital tablet, smart phone, user equipment, user device, terminal, among other devices. As used herein, the term "derive" may mean deriving locally from a device or obtaining from another device.

Overview

The aspects described herein generally relate to the derivation, provisioning, and use of uplink and downlink network tokens. The network tokens may be transported with packets in the user-plane. An uplink network token or a downlink network token may be embedded in, or otherwise included with, one or more packets and used for network policy enforcement and/or traffic steering (e.g., steering of one or more user-plane messages).

A request for a network token can be explicit or implicit. An explicit request may be included in, for example, a connection request made from a device to an application server, or from an application server to a device. The application server can be associated with one or more application services. The request, if explicit, can be transported with one or more packets including the connection request. A packet from a device to an application server, or from an application server to a device, passes through a packet data network gateway (P-GW) on its way from its source to its destination. At the P-GW, the packet can be inspected/reviewed/analyzed to determine if it explicitly includes (or implicitly represents) a request for a network token.

If, for example, a request for a network token is included with a connection request, the P-GW may derive the network token using a cryptographic function, an unshaved secret key known to the P-GW, and parameters that can be obtained from the packet and parameters associated with the services. However, the P-GW may not directly send the just-derived network token to the entity that requested the network token. Instead, it may embed, or otherwise include, the network token with the packet that carried the connection request and the request for the network token) and send the packet (with the just-derived network token) to its destination, e.g., a destination identified from the destination address (or at least a destination address prefix) in the packet header. A processing circuit, at the destination, prepares a response to the connection request (e.g., a connection response) and includes the network token in or with the packet that includes the connection response. The packet may be sent via the user-plane, to the source of the request for the network token and initiator of the connection request. Thereafter, when the source has additional packets to send to the destination, the source may include a copy of the network token in (or with) one or more of the additional packets.

Uplink network tokens and/or downlink network tokens may be used by a P-GW to enforce network policies. According to aspects described herein, a packet including a copy of a previously derived original network token may be received at a P-GW. The copy of the previously derived original network token may be an uplink network token or a downlink network token. The P-GW may verify the copy of the previously derived original network token. The verification process may include deriving a duplicate of the original network token. The duplicate network token may be derived in the same way as the original network token, using the same cryptographic function, the same unshared secret key known to the P-GW, and the same other parameters that may be obtained from the packet. The newly received packet associated with the copy of the original network token is different from the packet associated with the original network token; however, there are parameters that can be obtained from the newly received packet that are the same as those obtained from the original packet. These common parameters may be used in the cryptographic function to derive the duplicate network token. If the duplicate network token is equal to the copy of the original network token, then the just-received copy of the original network token may be considered successfully verified. Upon successful verification, the packet may be sent to its destination. If the verification is not successful, the packet can be discarded.

Exemplary Operating Environment

Figure 2:
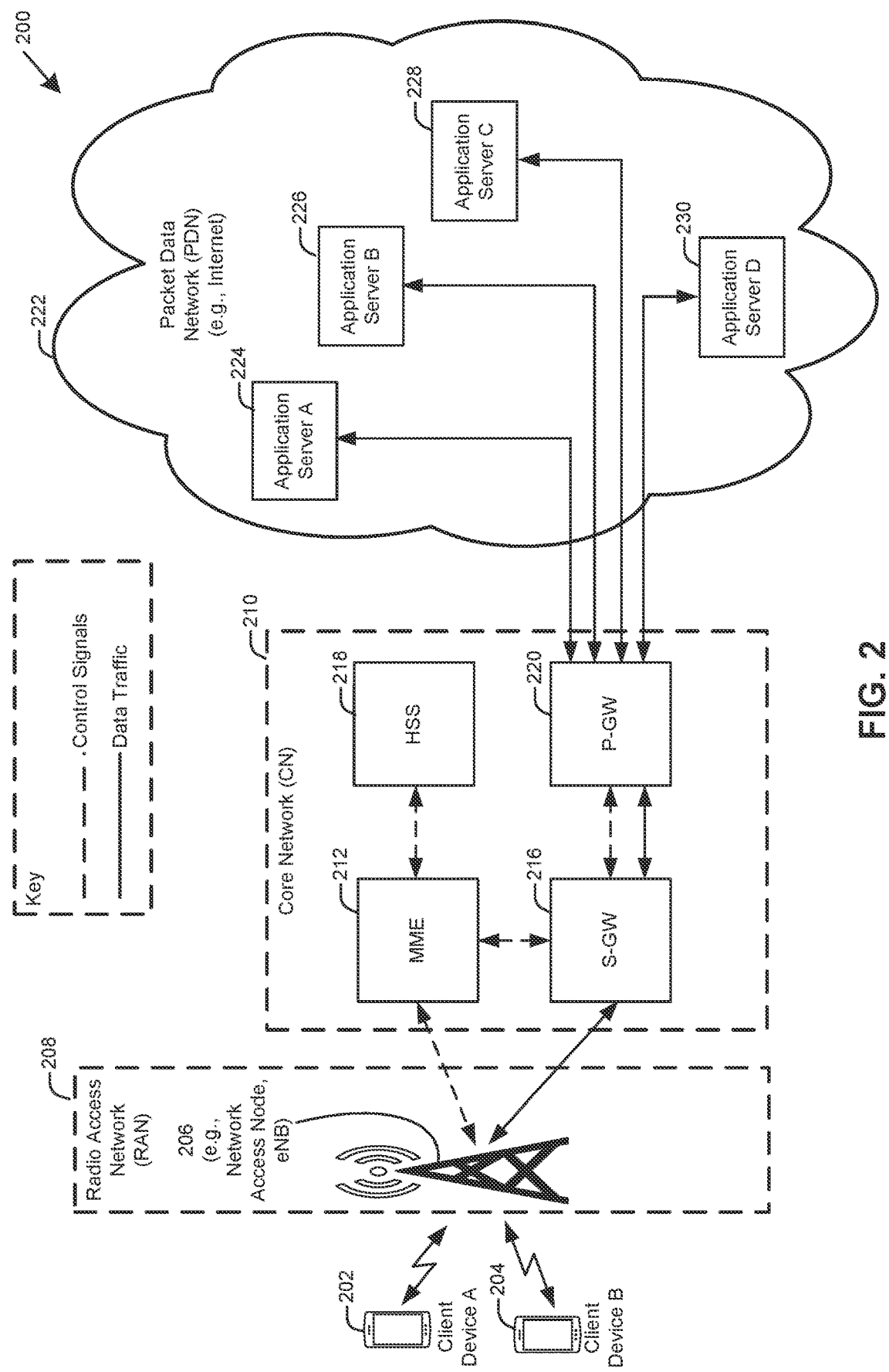
FIG. 2 illustrates an exemplary operating environment.

FIG. 2 illustrates an exemplary operating environment 200. In such an exemplary operating environment 200 one or more client devices 202, 204 (e.g., client device A, client device B) may communicate wirelessly with an access node 206 (e.g., Node B, eNodeB, access point (AP)). The access node 206 may be included within a radio access network (RAN) 208 (e.g., evolved universal terrestrial radio access network (E-UTRAN)). As known to those of skill in the art, the RAN 208 typically includes more than one access node 206. The drawing illustrates only one access node 206 to reduce clutter.

In a non-limiting example of a cellular communication system (e.g., 4G, LTE, LTE-A), the RAN 208 may communicate control-plane signaling and user-plane messages to a core network (CN) 210 (e.g., evolved packet core (EPC)). In the illustration of FIG. 2, broken lines represent control signal paths and solid lines represent user data message paths. A control plane conveys control signals (e.g., control-plane signaling). A user-plane conveys user data (e.g., user-plane messages). Implementations of the aspects described herein make use of the user-plane; control plane signaling is not required. Because control plane signaling is not required, network functionality is unaffected the most part. Modification of the user-plane protocol stacks of the client device and P-GW may be implemented in association with some of the aspects described herein. For example, a network token setup procedure may require protocol stack modification. In other words, when a client device initiates a connection request with an indication of a request for a network token, a gateway device derives the network token and embeds, or otherwise includes, the network token with the connection request (e.g., in the packet with the connection request). Aspects described herein provide several alternatives for embedding the network token (e.g., TCP, IP, Shim, etc.) and describe corresponding exemplary modifications to the protocol stacks to implement the embedding of network tokens.

A CN 210 may include a mobility management entity (MME) 212, a serving gateway (S-GW) 216, a home subscriber server (HSS) 218, and a packet data network gateway (P-GW) 220. The P-GW 220 may communicate with a packet data network (PDN) 222 (e.g., the Internet). More specifically, the P-GW 220 may communicate with servers 224, 226, 228, 230 (e.g., application servers) in the PDN 222. The servers 224, 226, 228, 230 may be associated with service providers, such as, for example, service providers that provide sales services, information services, streaming video services, and social media services.

Figure 3:
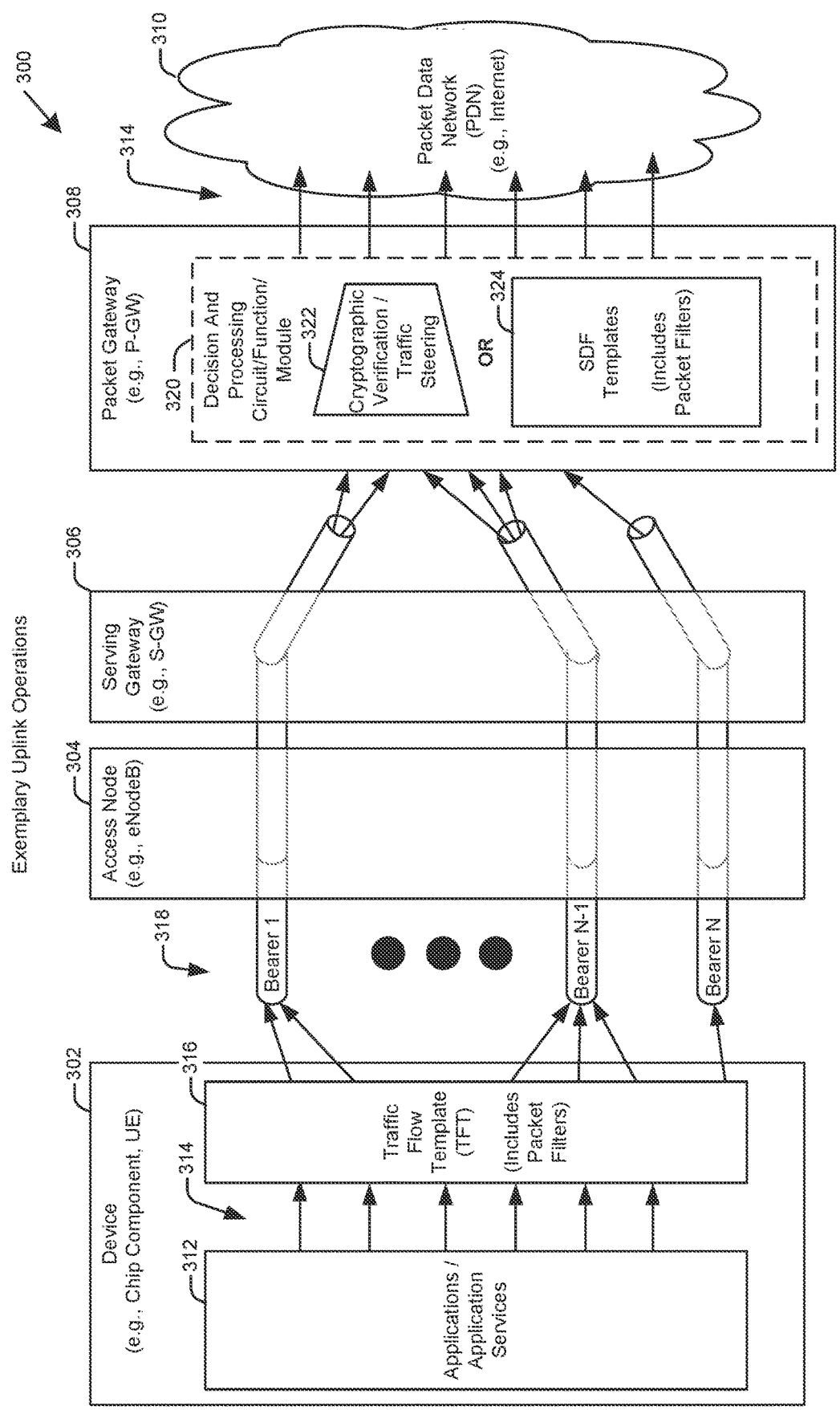
FIG. 3 illustrates an exemplary uplink operation in accordance with aspects described herein.

FIG. 3 illustrates an exemplary uplink operation 300 in accordance with aspects described herein. The exemplary uplink operation 300 is presented in the context of a long term evolution (LTE) system for convenience. The example is not intended to place any limitation on the scope of any aspects described herein.

Represented in FIG. 3 are a device 302 (e.g., chip component, client device, user equipment, user device, terminal, mobile device), an access node 304 (e.g., eNodeB), a serving gateway (S-GW) 306, a packet gateway (P-GW) 308 and a packet data network (PDN) 310 (e.g., the Internet).

The exemplary uplink operation 300 of FIG. 3 is now described. IP flows 314 (e.g., from applications/application services 312 of the device 302) are applied to packet filters (not shown) included with a traffic flow template (TFT) 316. The number of IP flows 314 depicted is illustrative and not intended to be limiting.

The packet filters of the TFT 316 filter the IP flows into bearers 318 (e.g., evolved packet system (EPS) bearers). Three bearers 318 (e.g., bearer 1, bearer N−1, and bearer N) are, illustrated for demonstrative purposes. In one aspect, a bearer can be shared by multiple applications/application services. Each bearer may be associated with a unique set of parameters.

IP flows 314 can be mapped, for example, to a default bearer or to one or more dedicated bearers. The default bearer may typically have a non-guaranteed bit rate, while the dedicated bearers may typically have either guaranteed or non-guaranteed bit rates. The bearers 318 may pass through the access node 304 and S-GW 306. Aspects of the access node 304 and S-GW 306 are not described herein and are known to those of ordinary skill in the art.

In one aspect, IP flows 314 from the bearers 318 may be passed to a decision and processing circuit/function/module 320. The decision and processing circuit/function/module 320 may cause UL packets received from the bearers 318 to be passed to a cryptographic-validation and traffic-steering circuit/function/module 322 or to service data flow (SDF) templates 324 and packet filters included therein (not shown). Traffic-steering encompasses the steering (e.g., directing, guiding) of signaling-related packets and/or user data message related packets.

UL packets having network tokens included therewith may be passed to the cryptographic-validation and traffic-steering circuit/function/module 322. Enforcement of one or more policies associated with a network token may be carried out upon successful validation of the network token.

UL packets that do not have network tokens included therewith may be passed to the SDF templates 324 by the decision and processing circuit/function/module 320. The use of the packet filters of the SDF templates 324 may require more processing and memory resources than does the use of the cryptographic-validation and traffic-steering circuit/function/module 322. To perform filtering using the packet filters of the SDF templates 324, for example, the P-GW 308 must maintain a separate table entry table for each SDF.

Accordingly, use of network tokens (and the consequent use of the cryptographic-validation and traffic-steering circuit/function/module 322) conserves resources and reduces latency. In one aspect, a cryptographic network token (e.g., a software token) may be used to supplement/enhance packet inspection. One advantage of this aspect includes scalability. That is, no table entries or states need to be kept on a fast-path (a.k.a., fast-pass). Another advantage of this aspect includes low latency. That is, a single cryptographic operation (e.g., a cryptographic hash such as SHA-1, SHA-2 or SHA-3 (where SHA stands for secure hash algorithm), or advanced encryption standard (AES), whichever may run faster or may be determined appropriate) may be sufficient for access control. Furthermore, the time required to perform a cryptographic operation on a network token should be independent of the number of application services that may be served by a P-GW. In contrast, the time required to cycle through the packet filters of an SDF template is dependent on the number of application services that may be served by the P-GW; increasing the number of application services increases the number of packet filters. Accordingly, the use of cryptographic network tokens for policy enforcement and/or steering of user-plane messages is beneficial.

Still another advantage may include flexibility. That is, the cryptographic network token may be derived based on various meta data. Such meta data is not limited to the parameters being filtered in TFT/SDF templates. Additionally, various policies (e.g., authenticity policies and/or authorization of packet policies) may be applied to the network token. Still another advantage may include a resilience to distributed denial of service (DDoS) attacks. That is, any packet including an erroneous/improper/non-authentic cryptographic network token will be dropped before being sent to a server (e.g., server 124, 126, 128, 130 of FIG. 1) thereby preventing the flooding of the server with packets. Still another advantage may lie in a feature of relocatability. Realization of this advantage may be understood by defining/mapping a filtering rule (or set of rules) to a corresponding secret key at the first gateway device, and then sharing the secret key with the second gateway device. Thus, during a handover between the first and second gateways, the aspect permits a relocation of SDF filters via a transfer/sharing of the secret key. This eliminates a need to transfer all of the data related to the filtering rule (or set of rules) associated with a given SDF filter. The advantage of relocatability, therefore, frees processing resources, which may otherwise have been used to transfer all of the data, for other purposes.

Figure 4:
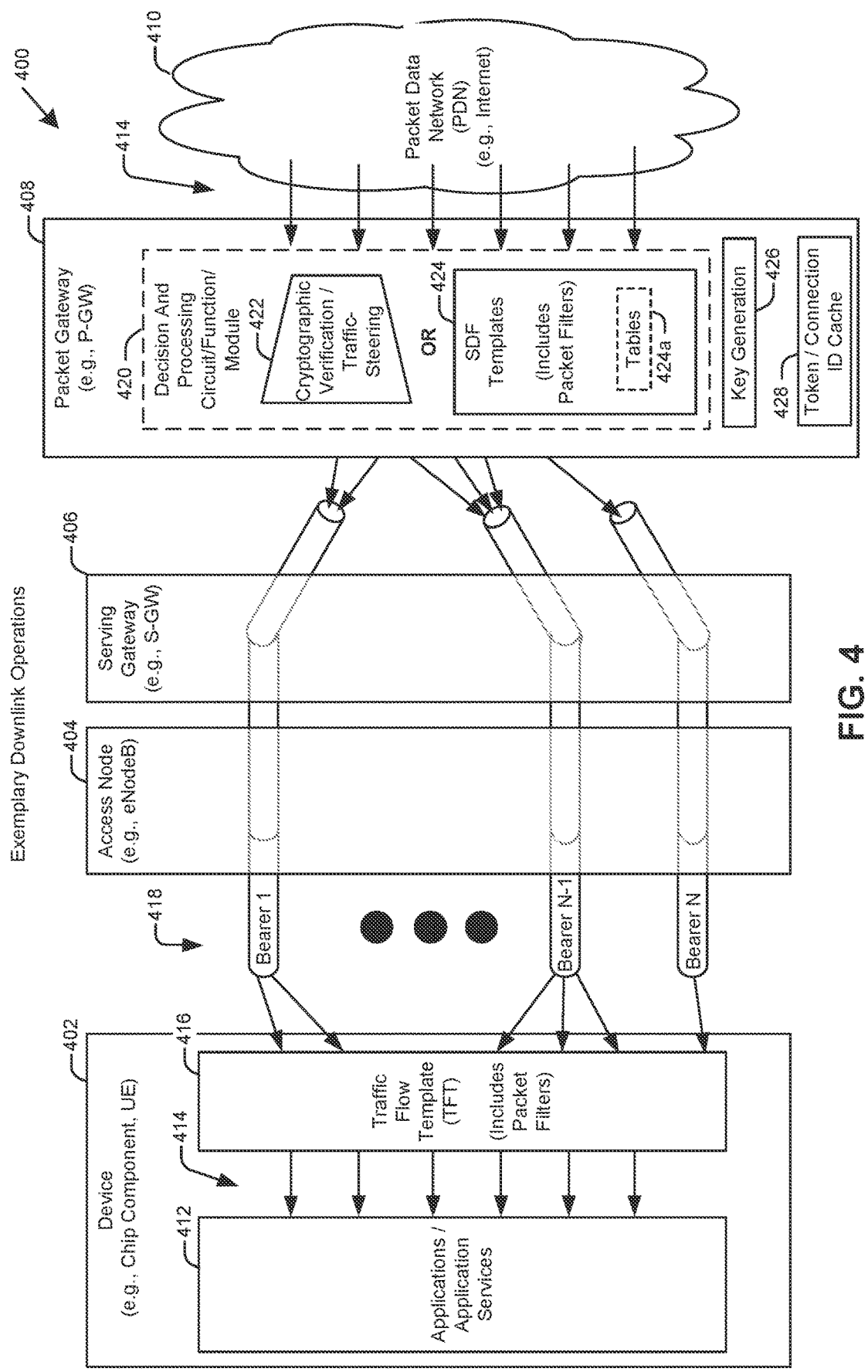
FIG. 4 illustrates an exemplary downlink operation in accordance with aspects described herein.

FIG. 4 illustrates an exemplary downlink operation 400 in accordance with aspects described herein. The example is presented in the context of a long term evolution (LTE) system for convenience. The example is not intended to place any limitation on the scope of any aspects described herein.

Represented in FIG. 4 are a device 402 (e.g., chip component, client device, user equipment, user device, terminal, mobile device), an access node 404 (e.g., eNodeB), a serving gateway (S-GW) 406, a P-GW 408, and a PDN 410 (e.g., the Internet).

The downlink operation in FIG. 4 is now described. Downlink IP flows 414 (e.g., from application servers, applications, application services residing in the PDN 410) may be applied to a decision and processing circuit/module/ device 420 of the P-GW 408. The number of downlink IP flows 414 depicted is illustrative and not intended to be limiting The decision and processing circuit/module/device 420 may cause downlink packets received from the downlink IP flows 414 to be passed to a cryptographic-verification and traffic-steering circuit/module/device 422 or to service data flow (SDF) templates 424 and packet filters therein (not shown).

Downlink packets having DL network tokens embedded therein, or otherwise included therewith, may be passed to the cryptographic-verification and traffic-steering circuit/ module/device 422. In one aspect, a DL network token and an application identifier (App ID) may be embedded, or otherwise included therewith, in a single downlink packet. The App ID may be used to determine an application access policy. The application access policy may be retrieved from an application server. In some embodiments, the application server may be the application server that initiates a request to communicate with a device, or it may be the application server with whom the device seeks to initiate communication; however, a third application server is also acceptable. In some aspects, the application access policy may be retrieved from an Application Function (AF) of an application server. In other aspects, the application access policy may be retrieved from a Subscriber Profile Repository (SPR) associated with a policy and charging rules function server or device.

In one aspect, the application access policy may include Quality of Service (QoS) parameters including, for example, service priority, maximum bandwidth, guaranteed bandwidth, and/or maximum delay. This information may be useable by the cryptographic-verification and traffic-steering circuit/module/device 422, or some other circuit/module/device, to select a data flow or bearer for the downlink packet associated with the DL network token.

Downlink packets in the downlink IP flows 414 that do not have DL network tokens embedded therein, or otherwise included therewith, may be passed to the SDF templates 424 by the decision and processing circuit/module/device 420 or other circuit/module/device (not shown).

Packet filters (not shown) may be included with the SDF templates 424. The use of the packet fitters of the SDF templates 424 may require more processing and memory resources than does the use of the cryptographic-verification and traffic-steering circuit/module/device 422. To perform filtering using the packet filters of the SDF templates 424, the P-GW 408 may need to maintain table(s) 424a having separate table entries for each SDF. Each table entry may require identification of multiple parameters, such as, but not limited to Application ID, maximum bit rate (MBR), and access point name-aggregate maximum bit rate (APN-AMBR).

The packet filters of the SDF templates 424 serve to filter the IP flows into hearers 418 (e.g., evolved packet system (EPS) or IP-CAN bearers). Three bearers 418 are illustrated for demonstrative purposes. In one aspect, a bearer can be shared by multiple applications/application services. Each bearer may be associated with a unique set of parameters.

Downlink IP flows 414 can be mapped, for example, to a default bearer or to one or more dedicated bearers. The default bearer may typically have a non-guaranteed bit rate, while the dedicated bearers may typically have either guaranteed or non-guaranteed bit rates. The bearers may pass through the S-GW 406 and access node 404. Aspects of the access node 404 and S-GW 406 are not described herein and are known to those of ordinary skill in the art.

Data Flows

In the aspects described herein, IP flows, data flows, or flows, need not be limited to bearers as presented in the exemplary illustration of FIG. 2. A client device may operate or run one or more applications. Each client application may be mapped to an application service operating or running on an application server. The application server can be associated with one or more application services. A flow may therefore be defined based on the application operating in the device and on the application server. A flow may be defined as a path that packets take between the application running at the client device and the application service running at the application server. Although a flow may be associated with an application operating on the client device, the flow does not necessarily identify the client device. A network token may be used to identify one or more flows. Accordingly, a network token may be associated with multiple flows.

One flow may be mapped to multiple services running on the same server in a network. For example, a client device may use one service offered by one provider on a server. The server typically has one IP address. However, the service may host multiple applications on the server. The multiple applications may include, for example, a mapping application, an information search application, and a social networking application. The multiple applications therefore have the same destination IP address, so from the perspective of a gateway of a core network (e.g., a P-GW), the multiple applications can be considered as a single flow instead of multiple flows. Accordingly, a single flow can be mapped to multiple services.

A flow can be associated with multiple services. In addition, a network token can be associated with multiple services where multiple application service providers may run the services. For example, a client device may have multiple sponsors (e.g., multiple service providers). In aspects described herein, a gateway device may derive a network token that is associated with the multiple application service providers. Consequently, a single token may be mapped to one or more application services that are in turn associated with one or more flows.

In several examples provided herein, a network token may be derived based on an application identifier (App ID). Derivation of network tokens, however, is not limited to such examples. Other parameters, and/or combinations of parameters, may be used to derive a network token. The App ID may be associated with one or more servers. For example, a given service provider may have different data centers (each with its own server) in different geographic locations. In such a case, the App ID would be associated with more than one server. The token may beneficially use the App ID instead of a server IP address. A gateway device can verify that the packet, associated with a network token, is heading toward a server of a given service provider, even though the network token does not specify an IP address of the destination server.

Token Setup And Use—Exemplary System Level Call Flows

The examples set forth herein may apply to an initial PDN connectivity request procedure (during which a default bearer may be set up) and to dedicated bearer setup procedures (during which one or more dedicated bearers may be set up).

Figure 5:
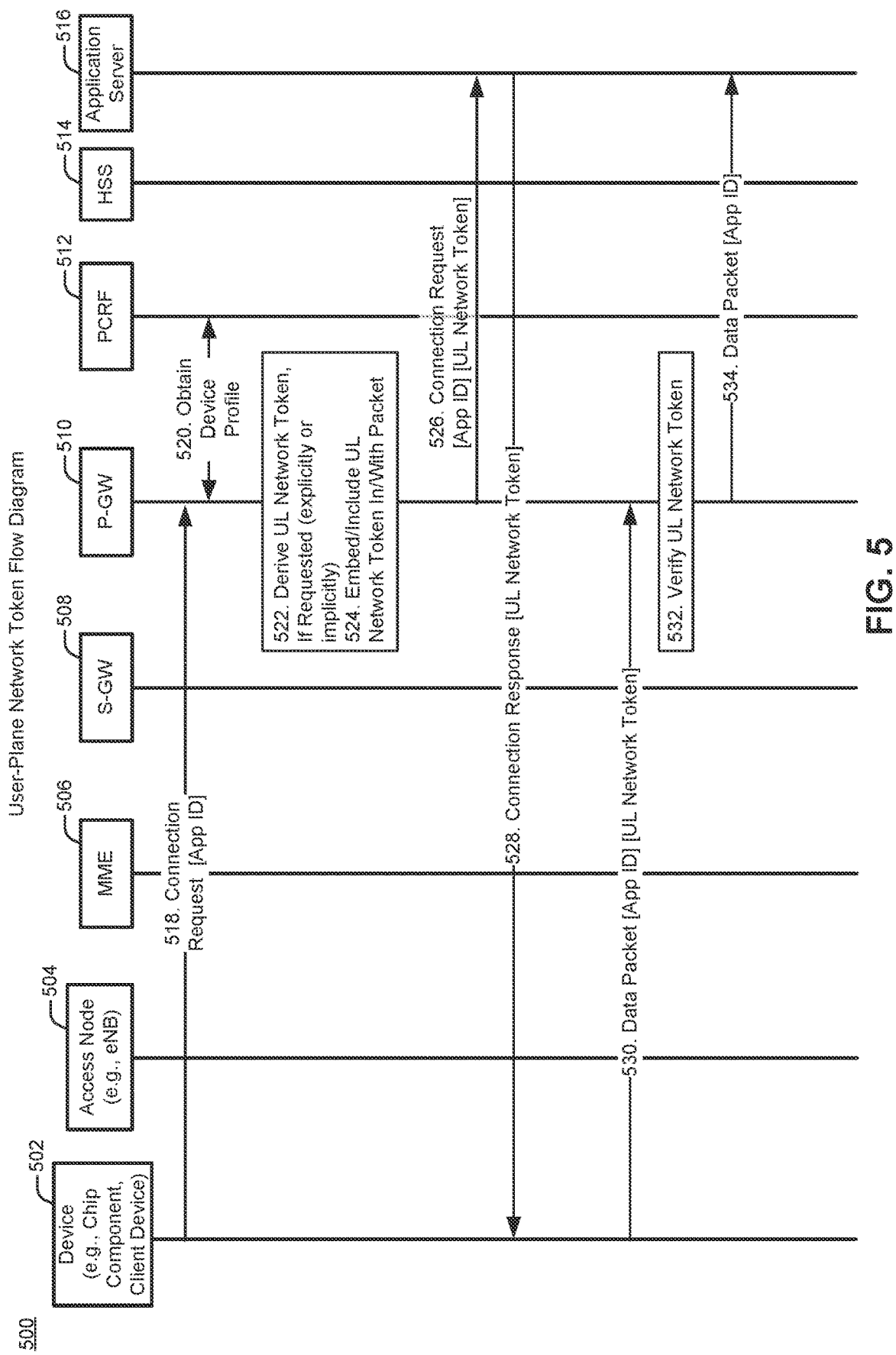
FIG. 5 is an exemplary call flow illustrating network token derivation, provisioning, and use in connection with one or more user-plane messages in accordance with aspects described herein.

FIG. 5 is an exemplary call flow 500 illustrating network token derivation, provisioning, and use in connection with one or more user-plane messages in accordance with aspects described herein. As noted, the call flow may be implemented in the user-plane. FIG. 5 includes representations of the device 502 (e.g., chip component, client device), an access node 504 (e.g., eNB), an MME 506, an S-GW 508, a P-GW 510, a policy and charging rules function (PCRF) 512 device, a home subscriber server (HSS) 514, and an and an application server 516.

In the exemplary call flow of FIG. 5, the device 502 may send 518 a connection request to an application server 516. The connection request may include an identifier, such as an application identifier (App ID). The connection request may transit a core network to a P-GW 510. The P-GW 510 may be a gateway for policy enforcement. The P-GW 510 may also be used to detect an express or an implicit request for a network token.

According to one aspect, the access node 504 (e.g., an eNodeB) may be an agnostic. That is, the access node 504 may not know that a device has sent a connection request in the user-plane to an application server 516, where the connection request either expressly includes a request for a network token or represents an implicit request for a network token. According to such an aspect, the request, and exchange of network tokens, may be transparent to an agnostic access node 504.

A determination may be made at the P-GW 510 as to whether a packet including the connection request sent from the device includes an express request for a network token or represents an implicit request for the network token. If the determination concludes that a need for a network token exists, the P-GW 510 may perform actions that include obtaining information required to derive a network token, derive the network token, and embed/include the network token with a packet that included the connection request from the device 502. As used herein, the term "derive" may mean deriving locally or obtaining from another device.

According to one aspect, the P-GW 510 may derive 522 the network token based on a hash of input parameters associated with the packet. In such an aspect, there may be no need to obtain additional information relating to the packet. If additional information is needed, the P-GW 510 may obtain 520 a profile of the device 502 from the PCRF 512. The PCRF 512 may obtain the subscription profile of the device from a subscription profile repository (SPR) coupled to the PCRF 512. Other ways of obtaining the profile of the device 502 may be acceptable.

The P-GW 510 may derive 522 the network token. According to one aspect, the network token may be derived based on a hash of input parameters associated with the packet. According to one aspect, the network token may be derived based on information associated with the connection request and/or the device profile. According to one example, the network token may be derived as:

Network Token=CI|HMAC (KP-GW,
CI|IPC|IPS|PC|PS|Proto|App ID| . . . ), where: CI is the class index that defines the fields used for token derivation, HMAC is a keyed-hash message authentication code, KP-GW is a secret key of P-GW, IPC is the client (e.g., device) IP address, PC is the client port number, IPS is the server (e.g., destination or application server) IP address, PS is the server port number, and Proto is the protocol number or identifier, and App ID is an application identifier. Additional or alternate parameters may include a priority and/or a quality of service class identifier (QCI). Other formulae for derivation of the network token may be acceptable.

The P-GW 510 may embed/include 524 the network token with a packet that included the connection request. The P-GW may then send 526 the connection request, including the network token derived by the P-GW 510, to the application server 516. The connection request may include an application identifier (App ID).

The application server 516 may then send 528 a connection response to the device 502. The connection response may include the network token. Thereafter, the device 502 may include the network token with one or more uplink data packets constructed for data transmission to the application server 516. In some aspects, the device 502 may include the network token with every uplink data packet destined for the application server 516.

With respect to enforcement, the device 502 may send 530 an uplink data packet to the application server 516. The uplink data packet may include the network token. The uplink data packet, including the network token, may transit a core network to the P-GW 510. As stated, the P-GW 510 may be a gateway for policy enforcement.

When the P-GW 510 receives the uplink data packet sent from the device 502, the P-GW 510 may verify 532 the network token included with the uplink data packet. According to one aspect, verification may be by re-deriving a token (i.e., derive a verification token or a duplicate of the original network token) and comparing the re-derived token with the network token embedded with the uplink data packet. If verification is successful, the P-GW 510 can discard the embedded network token and may send 534 the uplink data packet to the application server 516. If verification is not successful, the P-GW may discard the uplink data packet and the embedded network token.

A secret key known to the P-GW 510 may be used in a cryptographic function to derive the original network token and the verification token (e.g., a duplicate of the original network token). In one example, the P-GW 510 may derive the network token in view of an application access policy retrieved from an application function (AF). In one aspect, the access policy may associate a flow to an application. The network token may further be derived in view of the App ID, e.g., the App ID is included with the request for the network token. In some aspects, the network token may include encrypted information. Decryption may be accomplished using a cryptographic function having as its input, in one example, the secret key known to the P-GW 510. By way of example, successful decryption of the network token may yield a value that may indicate, in association with the UL packet that included the network token, a destination address or destination address prefix of a server and/or application service and/or a source address of a client device and/or an access node from which the UL packet was sourced. In one aspect, the ability to obtain, for example, destination address or destination address prefix of a server and/or application service from a network token may mean that the packet associated with the token is authorized to be sent to that destination and may further mean that the SDF templates (and their associated packet filters) are not needed. Packet inspection may thus be avoided.

Aspects using the user-plane as described herein, may apply equally well to the uplink and downlink directions.

Figure 6:
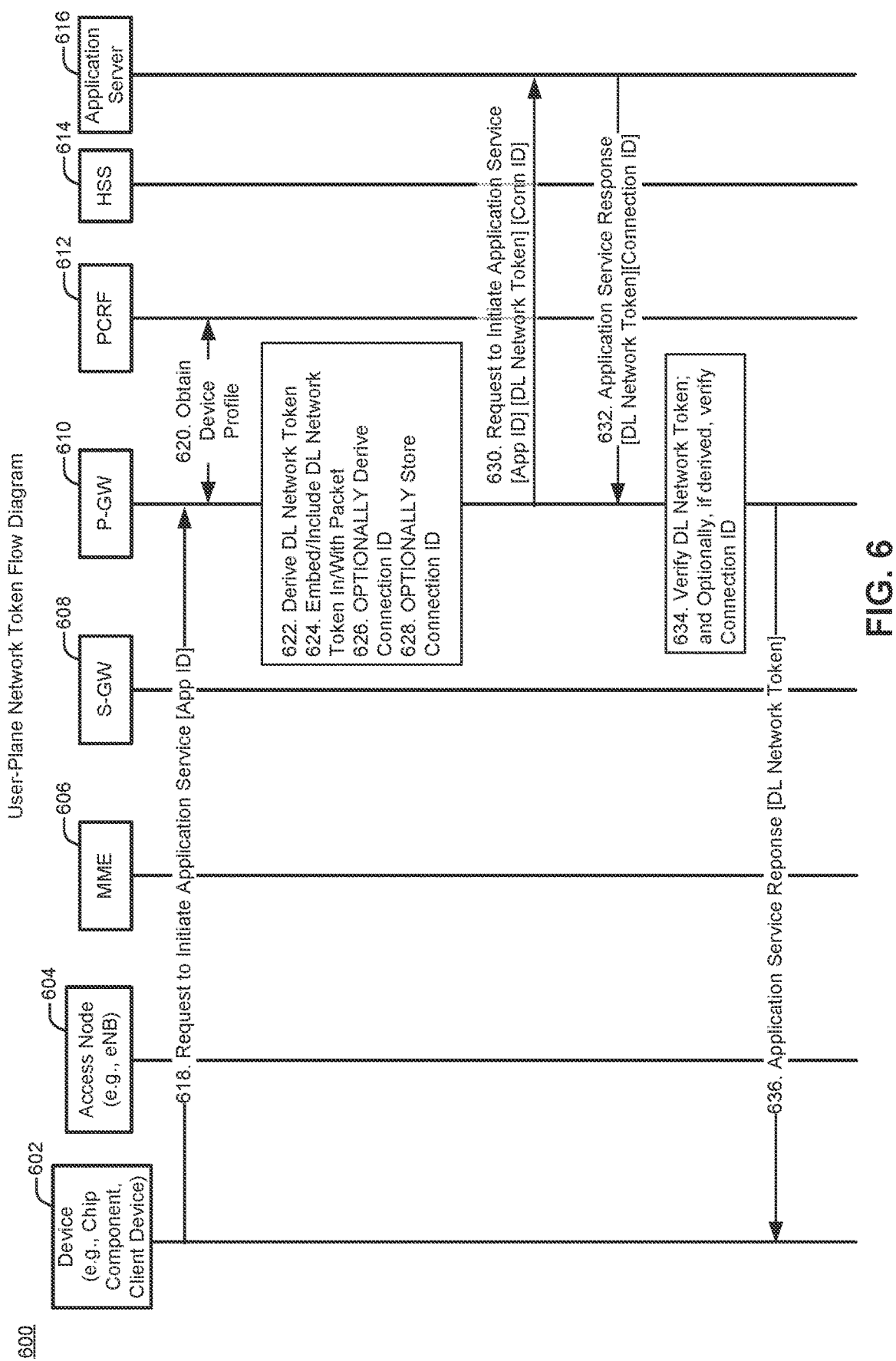
FIG. 6 is an exemplary call flow illustrating network token derivation, provisioning, and use in connection with one or more user-plane messages in accordance with aspects described herein.

FIG. 6 is an exemplary call flow 600 illustrating network token derivation, provisioning, and use in connection with one or more user-plane messages in accordance with aspects described herein. As noted, the call flow may be implemented in the user-plane. FIG. 6 includes representations of the device 602. (e.g., chip component, client device), an access node 604 (e.g., eNB), an MME 606, an S-GW 608, a P-GW 610, a policy and charging rules function (PCRF) 612 device, a home subscriber server (HSS) 614, and an and an application server 616. According to the exemplary call flow 600, a downlink (DL) network token may be issued to the application server 616 by a P-GW 610 via an implicit or explicit request for use of a DL network token by the device 602.

In the exemplary call flow of FIG. 6, the device 602 sends 618 a request to initiate an application service with the application server 616 via the P-GW 610. The request may be accompanied by or may include an application identifier (App ID). As will be understood by those of skill in the art, the request provided to the application server 616 from the device 602 is different from, and should not be confused with, any type of connection request to establish or reestablish a connection between the device and a network. In the former case, the device is requesting a service from the application server (the service may even be a connectionless service), while in the latter case, the device is requesting a connection to the network.

In one aspect, the request to initiate the application service represents an implicit request for use of a downlink (DL) network token. The implicit request for use of the downlink network token may be recognized by sending an initial packet from the device 702 to the application server 716 to the via the P-GW 710. In one example, an implicit request may be triggered by an operator's policy that requires packets from the application server to carry the DL network tokens. Recognition of such a policy may be obtained, for example, by a P-GW performing packet inspection on packets provided by a service and deciding that the service requires a DL network token for enforcement of a pre-defined network policy. Other ways to indicate the implicit request for use of the downlink network token are acceptable.

In one aspect, the request to initiate the application service may include an explicit request for use of a DL network token in transmissions sent to the device from the application server. In one aspect, an explicit request could be included in the first packet sent to the application server 716; however, this is not a requirement.

Use of DL network tokens may occur upon initiation of an application service or modification of an application service.

In response to receipt of an explicit or implicit request to use DL network tokens, in one aspect, the P-GW 610 may obtain 620 a device profile from a PCRF 612. The P-GW 610 may derive 622 a DL network token using, by way of example only, the following formula:

DL Network token=KeyID|CI|Policy ID|H(KP-GW, Policy ID|IPS|IPC|PS|PC|Proto|App ID| . . . ), where: KeyID is the identifier of the key used for token derivation (i.e., $K_{P-GW}$) CI is the class index that defines the fields used for token derivation or a list of input parameters used to derive the token, Policy ID is a policy identifier that defines a flow treatment policy (e.g., QoS policy, mapping the flow to a bearer, and other aspects of flow treatment policies as understood by those of skill in the art), H is a secure hash function (alternatively a hash message, authentication code (HMAC) could be used), $K_{P-GW}$ is a secret key of P-GW, $IP_C$ is the client (e.g., device) IP address, $P_C$ is the client port number, $IP_S$ is the server IP address, $P_S$ is the server port number, Prato is a protocol number, and App ID is the application identifier. The Policy ID included in the downlink token may be used to map the downlink packet to a given bearer. Alternatively, it may be possible to use the KeyID for Policy ID; in which case the Policy ID value may not be needed in the calculation of the DL network token.

Once derived, the DL network token may be embedded 624 in or otherwise included with a packet with the request to initiate the application service.

Optionally, the P-GW 610 may derive 626 a connection identifier (Connection ID or Conn ID) that can be used to identify a device initiated connection. In one aspect, the Connection ID may be derived as:

Connection ID=KeyID|CI|HMAC (K'P-GW, IPS|IPC|PS|PC|Proto), where, $K'_{P-GW}$ may be a secret key known to the P-GW that is different from the secret key used to derive the DL network token. The Connection ID may be stored 628 in a cache within the P-GW 610.

The request to initiate application service, including the embedded/included DL network token derived by the P-GW 610, may be sent 630 to the application server 616. The request to initiate application service may include the application identifier (App ID), the DL network token, and, if derived, the Connection ID.

The application server 616 may send 632 an application service response including the DL network token (e.g., a copy of the DL: network token) and, if derived, the Connection ID, to the device 602 via the P-GW 610.

When the P-GW 610 receives a packet having a DL network token embedded therein, the P-GW 610 may verify 634 the DL network token, for example, by deriving a token from data contained in the packet using the same formula as described above in connection with deriving the original network token. That is, the P-GW 610 may re-derive the original DL network token with data from the packet received from the application server 616, instead of with data received from the device 602. As will be understood by those of skill in the art, not all of the data in the packet received from the device 602 will be identical to the data in the packet received from the application server 616. However, as also will be understood by one of skill in the art, in one aspect, common data included in both the packet received from the device 602 and the packet received from the application server 616 could be used to re-derive the original DL network token (also referred to herein as a verification token). As described above in connection with an exemplary derivation of the original DL network token, such common data may include CI, IPS, IPC, PS, PC, Proto, and/or App ID. This list is intended to be exemplary and not limiting.

In such an aspect, verification may be accomplished by comparing the re-derived DL network token with the DL network token embedded in the packet received from the application server 616.

If validation was successful, the application service response from the application server 616 may be sent 636 to the device 602. In one aspect, the P-GW 610 may embed, or leave embedded or otherwise attached, the DL network token with the response. In another aspect, the P-GW 610 may discard the DL network token before the response is sent 636 to the device 602 (not shown). If the validation was not successful, the P-GW 610 may discard the response (not shown).

Thereafter, the application server 616 may embed/include a copy of the DL network token in one or more packets (related to the communication session for which the DL network token was derived) sent to the device 602 from the application server 616 via the P-GW 610. In some aspects, the application server 616 may embed/include a copy of the DL network token in every packet (related to the communication session for which the DL network token was derived) sent to the device 602 from the application server 616 via the P-GW 610.

Figure 7:
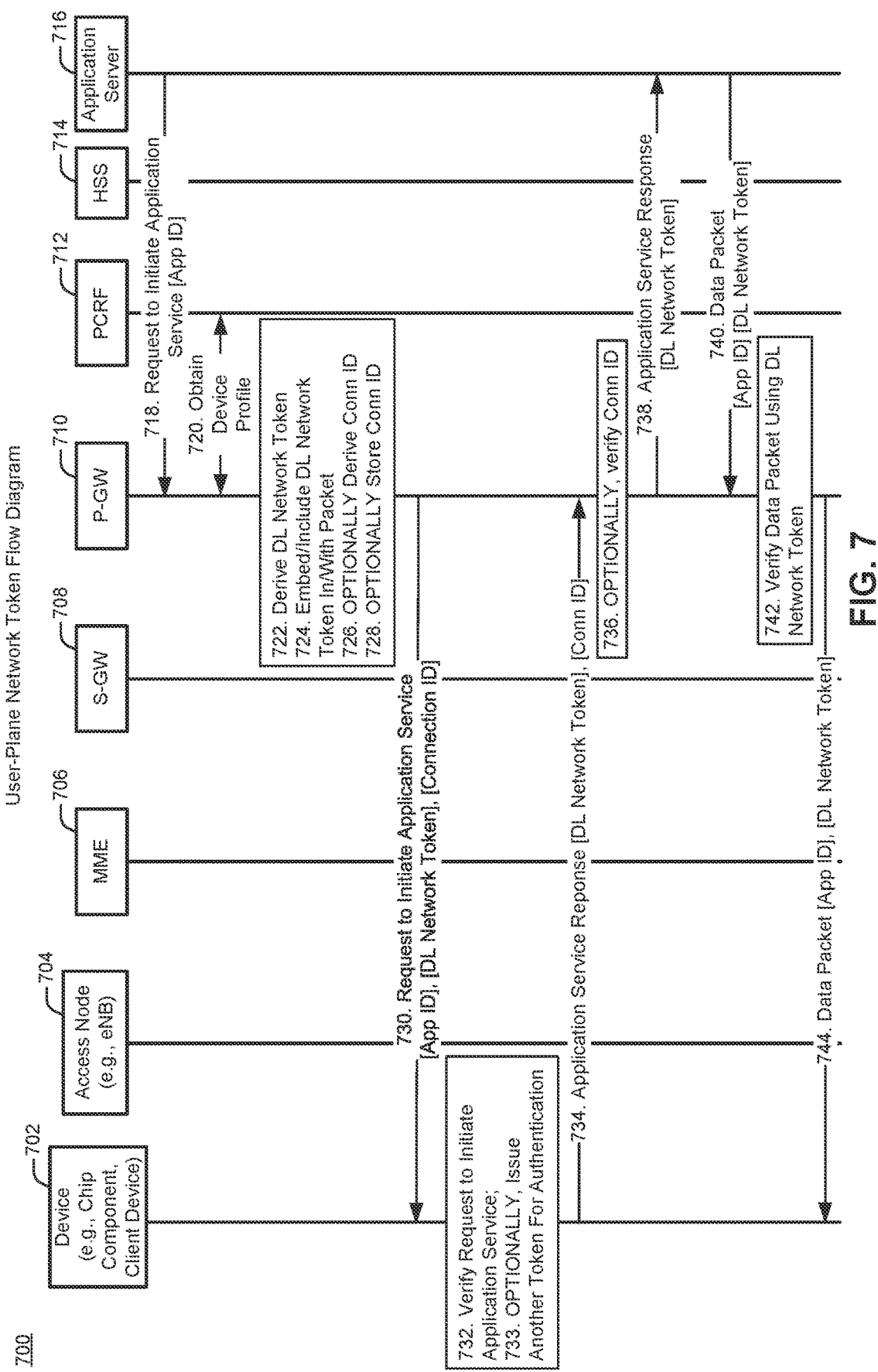
FIG. 7 is an exemplary call flow illustrating network token derivation, provisioning, and use in connection with one or more user-plane messages in accordance with aspects described herein.

FIG. 7 is an exemplary call flow diagram 700 illustrating network token derivation, provisioning, and use in connection with one or more user-plane messages in accordance with aspects described herein. As noted, the call flow may be implemented in the user-plane. FIG. 7 includes representations of the device 702 (e.g., chip component, client device), an access node 704 (e.g., eNB), an MME 706, an S-GW 708, a P-GW 710, a policy and charging rules function (PCRF) 712 device, a home subscriber server (HSS) 714, and an and an application server 716. According to the exemplary call flow diagram 700, a downlink (DL) network token may be issued to the application server 716 by a P-GW 710 via an implicit or explicit request for use of a DI, network token made by the application server 716.

In the exemplary call flow of FIG. 7, the application server 716 sends 718 a request to initiate an application service with the device 702 via the P-GW 710. The request may be accompanied by or may include an application identifier (App ID). As will be understood by those of skill in the art, the request provided to the device 702 from the application server 716 is different from, and should not be confused with, any type of connection request to establish or reestablish a connection between the application server and a network. In the former case, the application server is requesting to provide an application service to a device (the service may be a connectionless service), while in the latter case, the application server is requesting a connection to the network.

In one aspect, the request to initiate the application service represents an implicit request for use of a downlink (DL) network token. The implicit request for use of the downlink network token may be recognized by sending an initial packet from the application server 716 to the device 702 via the P-GW 710. In one example, an implicit request may be triggered by an operator's policy that requires packets from the application server to carry the DL network tokens. Recognition of such a policy may be obtained, for example, by a P-GW performing packet inspection on packets provided by a service and deciding that the service requires a UL network token for enforcement of a pre-defined network policy. Other ways to indicate the implicit request for use of the downlink network token are acceptable.

In one aspect, the request to initiate the application service may include an explicit request for use of a DL network token in transmissions sent to the device from the application server. In one aspect, an explicit request could be included in the first packet sent to the device 702; however, this is not a requirement.

Use of DL network tokens may occur upon initiation of an application service or modification of an application service.

In response to receipt of an explicit or implicit request to use DL network tokens, in one aspect, the P-GW 710 may obtain 720 the device profile from a PCRF 712. The P-GW 710 may derive 722 a DL network token using, by way of example only, the following formula:

DL network token=KeyID|CI|Policy ID|H(KP-GW
Policy ID|IPS|IPC|PS|PC|Proto|App ID| . . . ), where: KeyID is the identifier of the key used for token derivation (i.e., $K_{P-GW}$) CI is the class index that defines fields used for token derivation or a list of input parameters used to derive the token, Policy ID is a policy identifier that defines a flow treatment policy (e.g., QoS policy, mapping the flow to a bearer, and other aspects of flow treatment policies as understood by those of skill in the art), H is a secure hash function (alternatively a hash message authentication code (HMAC) could be used), $K_{P-GW}$ is a secret key of P-GW, $IP_C$ is the client (e.g., device) IP address, $P_C$ is the client port number, $IP_S$ is the server IP address, $P_S$ is the server port number, Proto is a protocol number, and App ID is the Application identifier. The Policy ID included in the downlink token may be used to map the downlink packet to a given bearer. Alternatively, it may be possible to use the KeyID for Policy ID; in which case the Policy ID value may not be needed in the calculation of the DL network token.

Once derived, the DL network token may be embedded 724 in, or otherwise included with, a packet with the request to initiate the application service.

Optionally, the P-GW 710 may derive 726 a connection identifier (Connection ID or Conn ID) that can be used to identify a server initiated connection. In one aspect, the Connection ID may be derived as:

Connection ID=KeyID|CI|HMAC (K'P-GW,
IPS|IPC|PS|PC|Proto), where, $K'_{P-GW}$ may be a secret key known to the P-GW that is different from the secret key used to derive the DL network token. The Connection ID may be stored 728 in a cache within the P-GW 710.

The request to initiate application service, including the embedded/included DL network token derived by the P-GW 710, may be sent 730 to the device 702. The request to initiate application service may include the application identifier (App ID), the DL network token, and, if derived, the Connection ID.

When the device 702 receives the request to initiate application service including the embedded DI, network token, the device 702 may verify 732 the request. Optionally, the device 702 may issue 733 another token for authentication.

The device 702 may grant the DL network token to the application server 716 by sending 734 the application service response, including the DL network token, to the application server 716 via the P-GW 710. The device 702 may embed, or otherwise include, the DL network token in an application service response. If the Connection ID was sent to the device 702, the device 702 may also embed, or otherwise include, Connection ID in the application service response.

If the Connection ID was derived 726 and stored 728, when the P-GW 710 receives a packet from the device 702 having a Connection ID and DL network token embedded therein or otherwise attached thereto, the P-GW 710 may verify 736 the Connection ID. Because the DL network token is used for verification and packet mapping in the downlink direction, in one aspect, the P-GW 710 may not verity the DL network token at this time; however, as stated, the P-G-W 710 may verify 736 the Connection ID.

Verification of the Connection ID may be accomplished, for example, by re-tie riving the original Connection ID from data contained in the packet using the same formula as described above in connection with deriving the original Connection ID. That is, the P-GW 710 may re-derive the original Connection ID with data from the packet received from the device 702, instead of with data received from the application server 716. As will be understood by those of skill in the art, not all of the data in the packet received from the device 702 will be identical to the data in the packet received from the application server 716. However, as also will be understood by one of skill in the art, in one aspect, only common data included in both the packet received from the device 702 and the packet received from the application server 716 would be used to re-derive the original connection ID (also referred to herein as a second connection ID or a verification connection ID). As described above in connection with an exemplary derivation of the original connection ID, such common data may include CI, IPC, IPS, PC, PS, and/or Proto. This list is exemplary and not limiting. In such an aspect, verification may be accomplished by comparing the re-derived Connection ID with the Connection ID embedded in the packet received from the device 702.

If verification was successful, or if the optional step of verifying the Connection ID was not performed, the application service response from the device 702 may be sent 738 to the application server 716. In one aspect, the P-GW 710 may embed, leave embedded, or otherwise attach or include, the DL network token with the application service response. In this manner, the application server 716 is provided with the DL network token. If the optional validation of the Connection ID was not successful, the P-GW 710 may discard the application service response (not shown).

Thereafter, the application server 716 may embed a copy of the DL network token in each packet (related to the communication session for which the DL network token was derived) sent 740 to the device 702 from the application server 716 via the P-GW 710. The P-GW 710 may verify 742 the data packet using the DL network token. If verification is successful, the P-GW 710 may send 744 the data packet to the device 702. If verification is not successful, the P-GW 710 may discard (not shown) the data packet.

Figure 8:
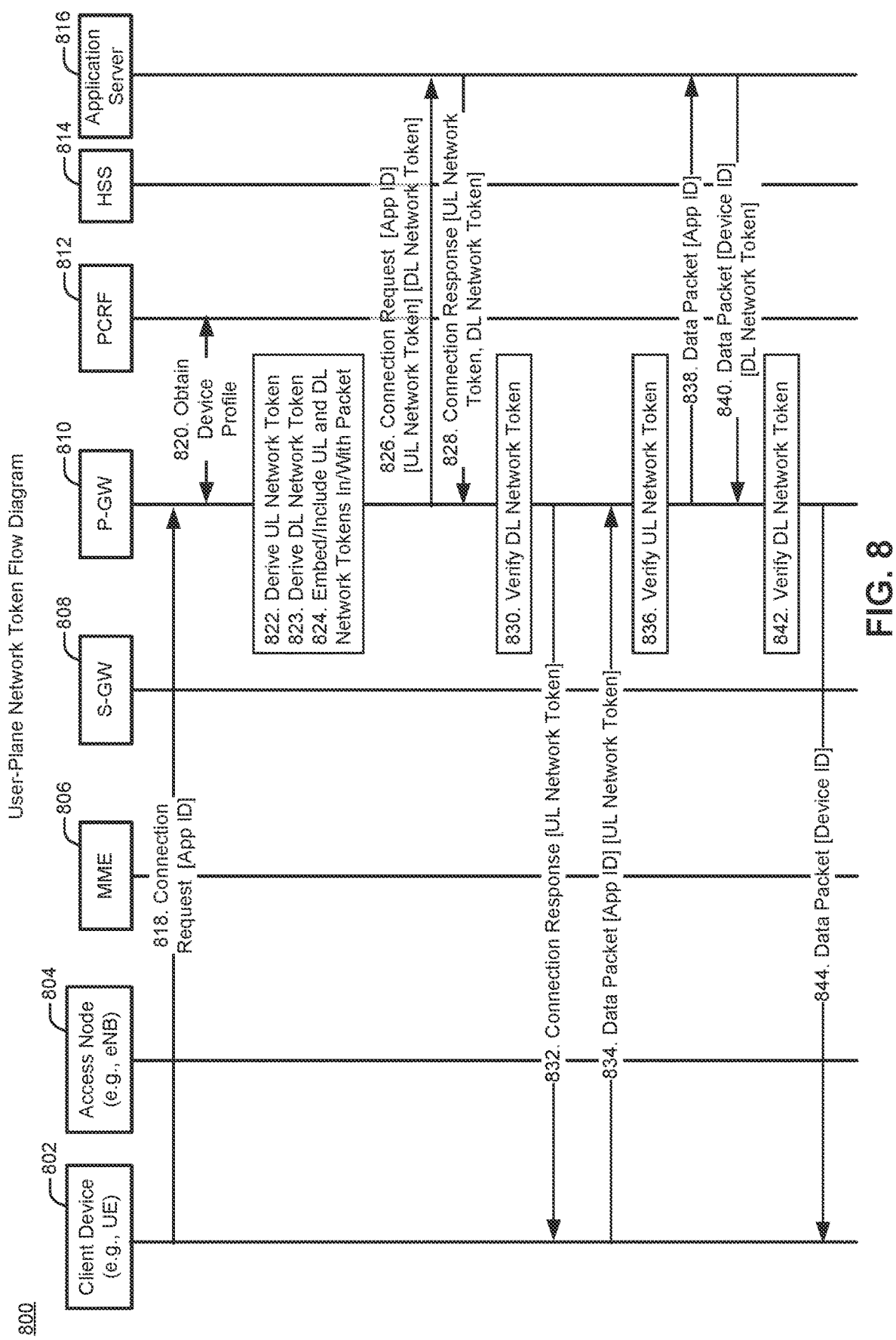
FIG. 8 is an exemplary call flow illustrating derivation, provisioning, and use of two network tokens (e.g., an uplink network token and a downlink network token) in connection with one or more user-plane messages in accordance with aspects described herein.

FIG. 8 is an exemplary call flow 800 illustrating derivation, provisioning, and use of two network tokens (e.g., an uplink network token and a downlink network token) in connection with one or more user-plane messages in accordance with aspects described herein. The call flow 800 of FIG. 8 may be implemented in the user-plane. The following explanation relates to derivation, provisioning, and enforcement of both the uplink and downlink tokens.

FIG. 8 includes representations of the device 802 (e.g., chip component, client device), an access node 804 (e.g., eNB), an MME 806, an S-GW 808, a P-GW 810, a policy and charging rules function (PCRF) 812 device, a home subscriber server (HSS) 814, and an and an application server 816.

In the exemplary call flow of FIG. 8, the device 802 may send 818 a connection request to an application server 816. The connection request may include an identifier, such as an application identifier (App ID). The connection request may transit a core network to a P-GW 810. The P-GW 810 may be a gateway for policy enforcement. The P-GW 810 may also be used to detect an express or an implicit request for a network token.

According to one aspect, the access node 804 (e.g., an eNodeB) may be an agnostic. That is, the access node 804 may not know that a device has sent a connection request in the user-plane to an application server 816, where the connection request either expressly includes a request for a network token or represents an implicit request for a network token. According to such an aspect, the request, and exchange of network tokens, may be transparent to an agnostic access node 804.

A determination may be made at the P-GW 810 as to whether a packet including the connection request sent from the device includes an express request for a network token or represents an implicit request for the network token. If the determination concludes that a need for a network token exists, the P-GW 810 may perform actions that include: obtaining information required to derive an UL network token and a DL network token; derive the UL and DL network tokens; and embed/include the UL and DL network tokens with a packet that included the connection request from the device 802. As used herein, the term "derive" may mean deriving locally or obtaining from another device.

According to one aspect, the P-GW 810 may derive 822 the UL network token based on a hash of input parameters associated with the packet. In such an aspect, there may be no need to obtain additional information relating to the packet. If additional information is needed, according to one aspect, the P-GW 810 may obtain 820 a profile of the device 802 from the PCRF 812. The PCRF 812 may obtain the subscription profile of the device from a subscription profile repository (SPR) coupled to the PCRF 812. Other ways of obtaining the profile of the device 802 may be acceptable. In a similar fashion, the P-GW 810 may derive 823 the DL network token.

The P-GW 810 may embed/include 824 the UL and DL network tokens with a packet that included the connection request. The P-GW 810 may then send 826 the connection request, including the UL and DL network tokens derived by the P-GW 810, to the application server 816. The connection request may include an application identifier (App ID).

The application server 816 may then send 828 a connection response to the device 802 via the P-GW 810. The connection response may include the UL network token and may also include the DL network token. If the DL network token is included with the connection response, the P-GW 810 may verify 830 the DL network token included with the connection response. According to one aspect, verification may be by deriving a duplicate of the original DL network token (i.e., derive a DL verification token) and comparing the re-derived original DL token with the DL network token embedded/included in/with the connection response. If verification is successful, the P-GW 810 can discard the DL network token and send 832 the connection response to the device 802 with the UL network token. If verification is not successful, the P-GW 810 may discard the connection request and the embedded/included DL network token and UL network token. Thereafter, the device 802 may include 834 the UL network token with one or more uplink data packets constructed for data transmission to the application server 816. In some aspects, the device 802 may include 834 the UL network token with every uplink data packet destined for the application server 816.

The application server 816 may retain the DL network token (e.g., a copy of the DL network token). Thereafter, the application server 816 may send 840 the DL network token with one or more downlink data packets constructed for data transmission to the device 802. In some aspects, the application server 816 may include the DL network token with every downlink data packet destined for the device 802.

With respect to enforcement in the uplink direction, the device 802 may send 834 an uplink data packet to the application server 816 via the P-GW 810. The uplink data packet may include the UL network token. The uplink data packet, including the UL network token, may transit a core network to the P-GW 810. As stated, the P-GW 810 may be a gateway for policy enforcement.

When the P-GW 810 receives the UI, data packet sent from the device 802, the P-GW 810 may verify 836 the UL network token included with the uplink data packet. According to one aspect, verification may be by re-deriving a token (i.e., derive a UL verification network token) and comparing the re-derived token with the network token embedded with the uplink data packet. If verification is successful, the P-GW 810 can discard the embedded network token and may send 838 the uplink data packet to the application server 816. If verification is not successful, the P-GW may discard the uplink data packet and the embedded UL network token.

With respect to enforcement in the downlink direction, the application server 816 may send 840 a downlink data packet to the device 802 via the P-GW 810. The downlink data packet may include a device ID to denote the device to which the packet is directed. The downlink data packet may include a DL network token. The DL network token may have been derived by the P-GW 810 in response to a request for use of downlink tokens received, explicitly or implicitly, from the device 802. The P-GW 810 may have provisioned the DL network token to the application server 816 in the user-plane. The P-GW 810 may verify 842 the DL network token included with the downlink data packet. According to one aspect, verification may be by deriving a duplicate of the original DL network token (i.e., derive a DL verification token) and comparing the re-derived original DL token with the DL network token embedded with the downlink data packet. If verification is successful, the P-GW 810 can discard the embedded DL network token and send 844 the downlink data packet to the device 802. If verification is not successful, the P-GW may discard the downlink data packet and the embedded DL network token.

In this aspect, the P-GW 810 may be able to efficiently direct IP flows in the downlink direction as well as in the uplink direction. Because the P-GW 810 derived the original DL network token, the P-GW 810 may be able to validate the DL network token received with packets from the application server 816. This may be a useful and efficient alternative to downlink packet inspection using TFT/SDF.

For example, a secret key known to the P-GW 810 may be used in a cryptographic function to derive the original DL network token and the verification DL network token. In one example, the P-GW 810 may derive the network token in view of an application access policy retrieved from an application function (AF). In one aspect, the access policy may associate a flow to an application. The network token may further be derived in view of the App ID or the device ID. In some aspects, the DL network token may include encrypted information. Decryption may be accomplished using a cryptographic function having as its input, in one example, the secret key known to the P-GW 810. By way of example, successful decryption of the DL network token may yield a value that may indicate, in association with the DL packet that included the DL network token, a destination address or destination address prefix of a device and/or an access node to which the DL packet is destined. In one aspect, the ability to obtain, for example, a device address from the DL network token may mean that the packet associated with the DL network token is authorized to be sent to that destination and may further mean that packet inspection is not needed. Packet inspection may thus be avoided.

Network tokens, both DL network tokens and UL network tokens, may be valid only under certain conditions. For example, in some aspects, network tokens may change periodically. In another aspect, the network token may be subject to expiration based on a pre-determined time since derivation of the network token. The network token might cease being valid upon expiry of the pre-determined time. In some aspects, a network token may be subject to expiration based on limitations placed on the key (KP-GW) used to derive the network token. For example, the key used to derive the network token may be replaced by a new key (K"P-GW). Replacement of an existing key (e.g., K'P-GW) with a new and different key (e.g., K"P-GW) may be due, for example, to a pre-determined timed expiration of the existing key, a key identifier, or some other event. When an existing network token is determined to no longer be valid, or no longer desired for use as a network token, the P-GW may derive a new network token to replace the presently used network token.

The decision to derive a new network token may rest, for example, with the P-GW. However, the decision may be made by other entities. For example, in one aspect, the device may determine that a new network token is needed, in another aspect, the application server may determine that a new network token is needed. In some aspects, an entity different from the entity that initiated use of the network token may initiate use of a new network token, even if the presently used network token is valid. In any aspect, new network token setup may precede as described herein. Those of skill in the art will understand that, at least one parameter (among the plurality of parameters used to derive the network token) may be required to be changed, lest the new network token be identical to the existing network token.

In one aspect, deriving the network token may include verifying an application identifier (App ID) and an application access policy associated with a device. The App ID may be included in a previously received packet, where the previously received packet was used to derive the network token. The App ID may be used to determine the application access policy. The application access policy may be retrieved from an application server. In one aspect, the application access policy may be retrieved from an Application Function (AF) of the application server. In another aspect, the application access policy may be retrieved from a Subscriber Profile Repository (SPR) in an application server. In one aspect, the application access policy may include Quality of Service (QoS) parameters including service priority, maximum bandwidth, guaranteed bandwidth, and/or maximum delay.

Token Use/Enforcement—Exemplary System Level Protocol Stacks

The aspects of use and enforcement in connection with the network tokens described above will now be presented.

Use of the network tokens may be described with respect to the movement of the network tokens among user-plane protocol stacks of a client device, an access node, a gateway device, and an application server. Illustrated herein are two figures illustrating exemplary sets of user-plane protocol stacks. Each figure is different from the next in its depiction of network token movement among the protocol stacks. Many of the layers represented in the protocol stacks, and the interconnections among the layers, are well known. These layers will be described briefly with respect to the illustration of FIG. 5. Their descriptions will not be repeated for each exemplary figure to avoid repetition and improve conciseness of the application. One of the figures includes a shim layer, which may be considered as a layer utilized for the movement of network tokens in connection with the respective aspects illustrated therein.

Figure 9:
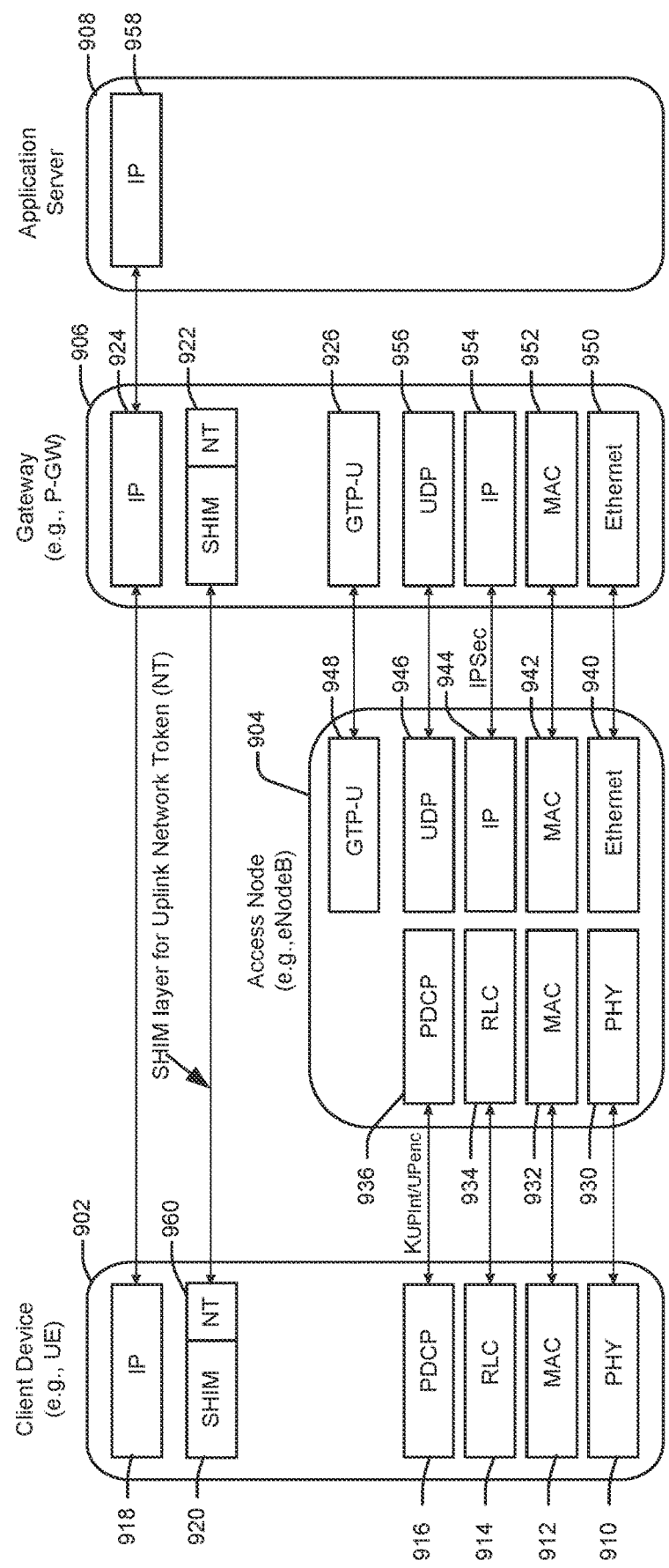
FIG. 9 is an exemplary illustration of user-plane protocol stacks of a system in accordance with one aspect described herein.

FIG. 9 is an exemplary illustration of user-plane protocol stacks 900 of a system in accordance with one aspect described herein. FIG. 9 depicts a client device 902, an access node 904, a gateway device 906, and an application server 908. In the exemplary illustration FIG. 9, a protocol stack of the client device 902 may include, from lowest layer upward, a physical (PHY) layer 910, a medium access control (MAC) layer 912, a radio link control (RLC) layer 914, a packet data convergence protocol (PDCP) layer 916, and an Internet Protocol UP) layer 918. In one aspect, a network token could be carried in an IP extension header defined in Internet Protocol (IP) version 6 (IPv6).

In one aspect, a shim layer 920 may be added to the user-plane protocol stack of a client device 902 and a corresponding shim layer 922 may be added the protocol stack of the gateway device 906. Shim layer 920 and corresponding shim layer 922 facilitate movement of network tokens from the client device 902 to the gateway device 906 in accordance with aspects described herein. In one aspect, the shim layer 920 lies below the IP layer 918 and above the MAC layer 912 of the client device 902. In this aspect, corresponding shim layer 922 lies below the IP Layer 924 and above the general packet radio service (GPRS) tunneling protocol (GTP) layer for the user-plane (GTP-U) of the gateway device 906. As known to those of skill in the art, the GTP-U provides services for carrying user data packets in the G-PRS backbone network.

The aspect illustrated by FIG. 9 may be useful for movement of a network token 960 from the client device 902 to the gateway device 906 without a need for any processing by the access node 904. Alternative methods are acceptable. By way of example, the client device 902 may receive a network token 960 from the application server 908 via user-plane messaging as described above. In accordance with one aspect of the use of the network token, the client device 902 may include the network token in packets destined for the application server 908. The network token 960 may be carried in a shim header of the shim layer 920 to the gateway device 906 as shown in FIG. 9. The network token 960 may be carried in the shim header separate from an IP header.

If verification of the network token at the gateway device 906 is successful, the gateway device 906 may forward the packet to the application server 908 after discarding the network token. If verification of the network token 960 at the gateway device 906 is not successful, the gateway device 906 may discard the packet and network token. In accordance with the illustrated aspect, no change would be needed at the application server 908 to support network token based application access.

For completeness of the description, the layers of the user-plane protocol stacks of the access node 904, gateway device 906, and application server 908 will now be briefly described. In the exemplary illustration of FIG. 9, a protocol stack of the access node 904 may include, from lowest layer upward, a physical (PHY) layer 930, a medium access control (MAC) layer 932, a radio link control (RLC) layer 934, and a packet data convergence protocol (PDCP) layer 936, which respectively join with like named layers (910, 912, 914, and 916) of the client device 902. In the exemplary illustration of FIG. 9, a protocol stack of the access node 904 may additionally include, from lowest layer upward, an Ethernet layer 940, a MAC layer 942, an IP layer 944, a user datagram protocol (MP) layer 946, and a GTP-U layer 948. These respective layers join with like named layers (1250, 952, 954, 956, and 926) of the gateway device 906. In the exemplary illustration of FIG. 9, the client device IP layer 918 joins the IP layer 924 of the gateway device 906, while the IP layer 924 of the gateway device 906 joins the IP layer 958 of the application server 908.

Figure 10:
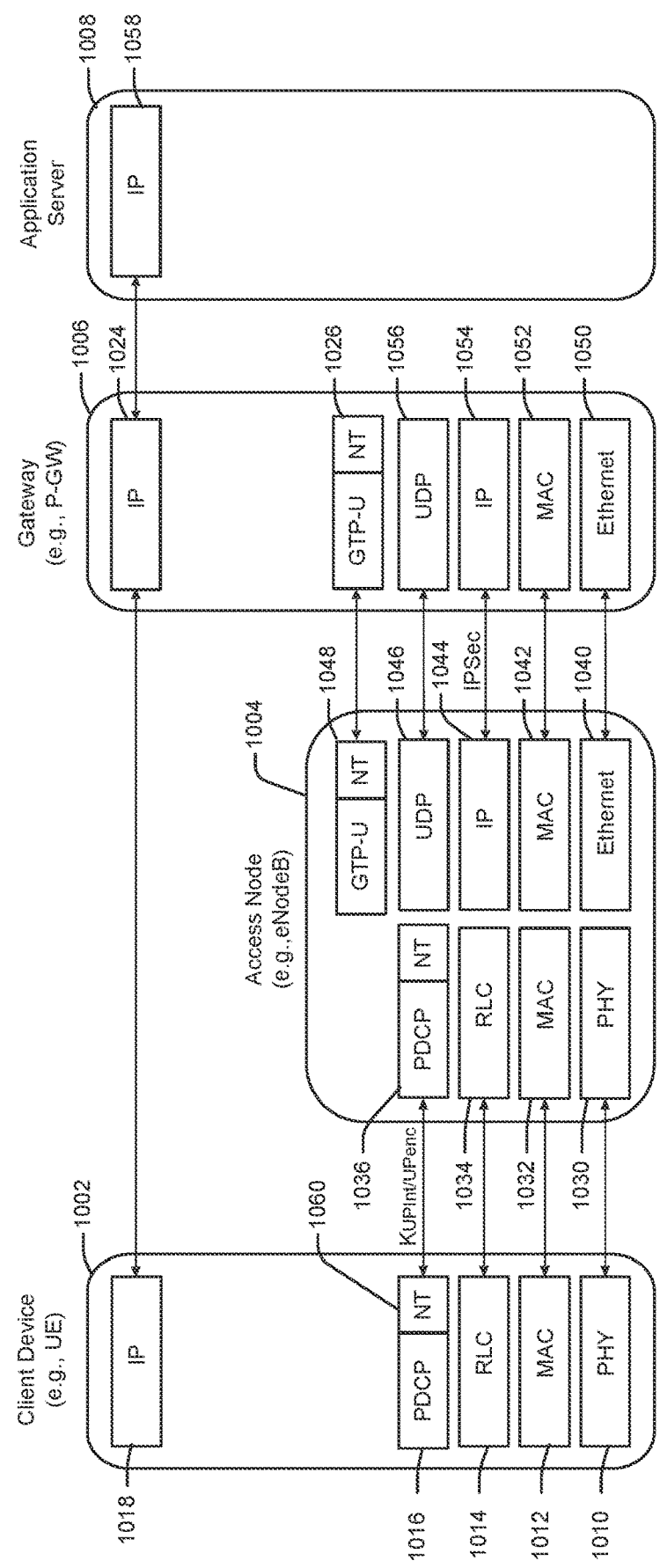
FIG. 10 is an exemplary illustration of user-plane protocol stacks of a system in accordance with another aspect described herein.

FIG. 10 is an exemplary illustration of user-plane protocol stacks 1000 of a system in accordance with another aspect described herein. FIG. 10 depicts a client device 1002, an access node 1004, a gateway device 1006, and an application server 1008.

The aspect illustrated by FIG. 10 may be useful for movement of a network token 1060 from the client device 1002 to the gateway device 1006 via the access node 1004. In this aspect, a shim layer is not required. By way of example, the client device 1002 may receive a network token 1060 from the application server 1008 via user-plane messaging as described above. In accordance with one aspect of the use of the network token, the client device 1002 may include the network token 1060 in packets destined for the application server 1008. The packet including the network token 1060 may be carried in a PDCP layer 1016 header from the client device 1002 to the PDCP layer 1036 of the access node 1004. The access node 1004 may copy the network token found in the PDCP header into a GTP-U header. The packet including the network token 1060 may then be carried in the GTP-U layer 1048 header from the access node 1004 to the GTP-U layer 1026 of the gateway device 1006. That is, in one aspect, the network token may be carried in a general packet radio service (GPRS) tunneling protocol (GTP) header. In one exemplary aspect, the network token originally sent to the client device 1002 from the application server 1008 may have been created at the gateway device 1006 using a secret key known to the gateway device. In such an aspect, the access node 1004 would be unable to verify the network token (because it would not possess the secret key needed for verification). Accordingly, an exemplary purpose of the access node 1004 in the illustration of FIG. 10 is to copy the network token from one header to another, thereby forwarding the network token from the client device 1002 to the gateway device 1006 via already existing PDCP layer 1036 header and GTP-U layer 1048 header. Once the network token arrives at the gateway device, if verification of the network token at the gateway device 1006 is successful, the gateway device 1006 may forward the packet to the application server 1008 after discarding the network token. If verification of the network token 1060 at the gateway device 1006 is not successful, the gateway device 1006 may discard the packet and network token. In accordance with the illustrate aspect, no change would be needed at the application server 1008 to support token based application access.

The layers of the user-plane protocol stacks of the client device 1002, access node 1004, gateway device 1006, and application server 1008 that were not described in connection with FIG. 10 will not be described as their descriptions are the same or similar to those of like named layers in FIG. 9.

Figure 11:
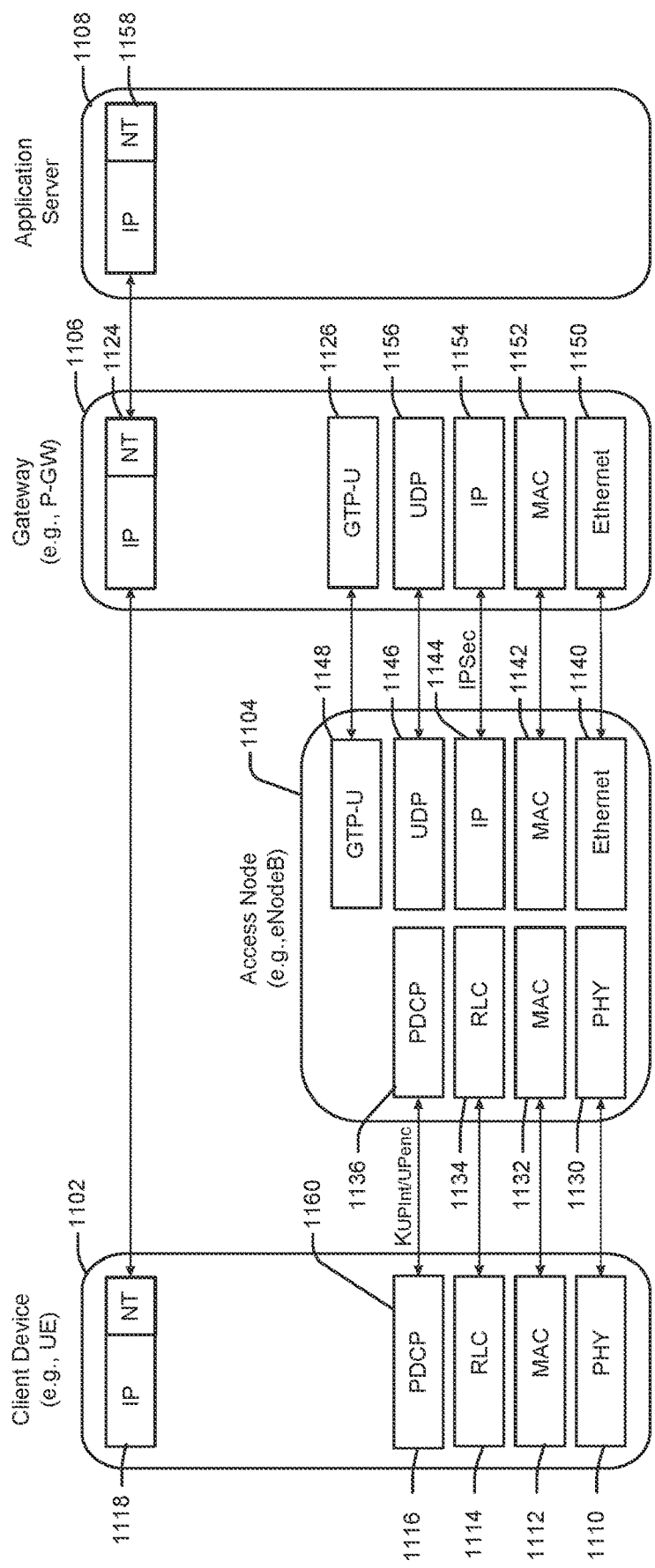
FIG. 11 is an exemplary illustration of user-plane protocol stacks of a system in accordance with another aspect described herein.

FIG. 11 is an exemplary illustration of user-plane protocol stacks 1100 of a system in accordance with another aspect described herein. The user-plane protocol stacks 1100 of FIG. 11 make use of an IP header for token embedding and transport. FIG. 11 depicts a client device 1102, an access node 1104, a gateway device 1106, and an application server 1108. In the exemplary illustration FIG. 11, a protocol stack of the client device 1102 may include, from lowest layer upward, a physical (PHY) layer 1110, a medium access control (MAC) layer 1112, a radio link control (RLC) layer 1114, a packet data convergence protocol (PDCP) layer 1116, and an Internet Protocol (IP) layer 1118.

In one aspect, the header of the IP layer 1118 may facilitate movement of network tokens between the client device 1102, gateway device 1106, and application server 1108 in accordance with aspects described herein. IPv4 and IPv6 may both employ the aspects described herein.

The aspect illustrated by FIG. 11 may be useful for movement of a downlink network token 1160 between the gateway device 1106 and client device 1102 without a need for any processing by the access node 1104. By way of example, during enforcement operations, the client device 1102 may receive a downlink network token 1160 from the application server 1108 via gateway device 1106 in one or more user-plane messages. In accordance with one aspect of the use of the downlink network token, the application server 1108 may include a copy of a given downlink network token in packets destined for the client device 1102. The IP header in the IP layer 1118, 1124, 1158 may carry the downlink network token 1160 (e.g., embedded in a downlink packet) to the gateway device 1106 as shown in FIG. 11. If verification of the downlink network token at the gateway device 1106 is successful, the gateway device 1106 may forward the packet to the client device 1102. The gateway device 1106 may or may not discard the network token prior to forwarding the packet that included the verified downlink network token. If verification of the downlink network token 1160 at the gateway device 1106 is not successful, the gateway device 1106 may discard the packet and network token. In accordance with the illustrated aspect, no change would be needed at the application server 1108 to support a DL token based policy enforcement protocol.

Concerning delivery of packets including DL tokens, in one aspect the DL token may be embedded in an IP header, such as an IP version 4 (IPv4) header or an IP version 6 (IPv6) header. The IP header in IPv4 may be an IPv4 Options Field. Concerning the IP Options Field, a new option number may need to be defined in Internet Engineering Task Force (IETF) for use of the exemplary IPv4 Options Field. The IP header in IPv6 may be an IP extension header. Concerning the IP extension header, a code, such as a Next Header Code, may need to be defined in Internet Engineering Task Force (IETF) for use of the exemplary IPv6 extension header. In one aspect, the DL token may be embedded in a Transmission Control Protocol (TCP) header. The DL token may be embedded in an Options field of the TCP header. In one aspect, the DL token may be embedded in a Transport Layer Security (TLS) record header. Concerning the TLS record, a new record type may need to be defined in Internet Engineering Task Force (IETF) for the exemplary TLS record protocol. In one aspect, the DL token may be embedded in a shim header between an IP header and a Transmission Control Protocol/User Datagram Protocol (TCP/UDP) header. In still another aspect, the DL token may be embedded in a Hypertext Transfer Protocol (HTTP) header. The HTTP header may be an HTTP experimental or eXtension header. The HTTP experimental or extension header may make use of an X-tag for unsecure HTTP connections.

The layers of the protocol stacks of the client device 1102, access node 1104, gateway device 1106, and application server 1108 that were described in connection with FIG. 11 will not be described as their descriptions are the same or similar to those of like named layers in FIG. 9.

Figure 12:
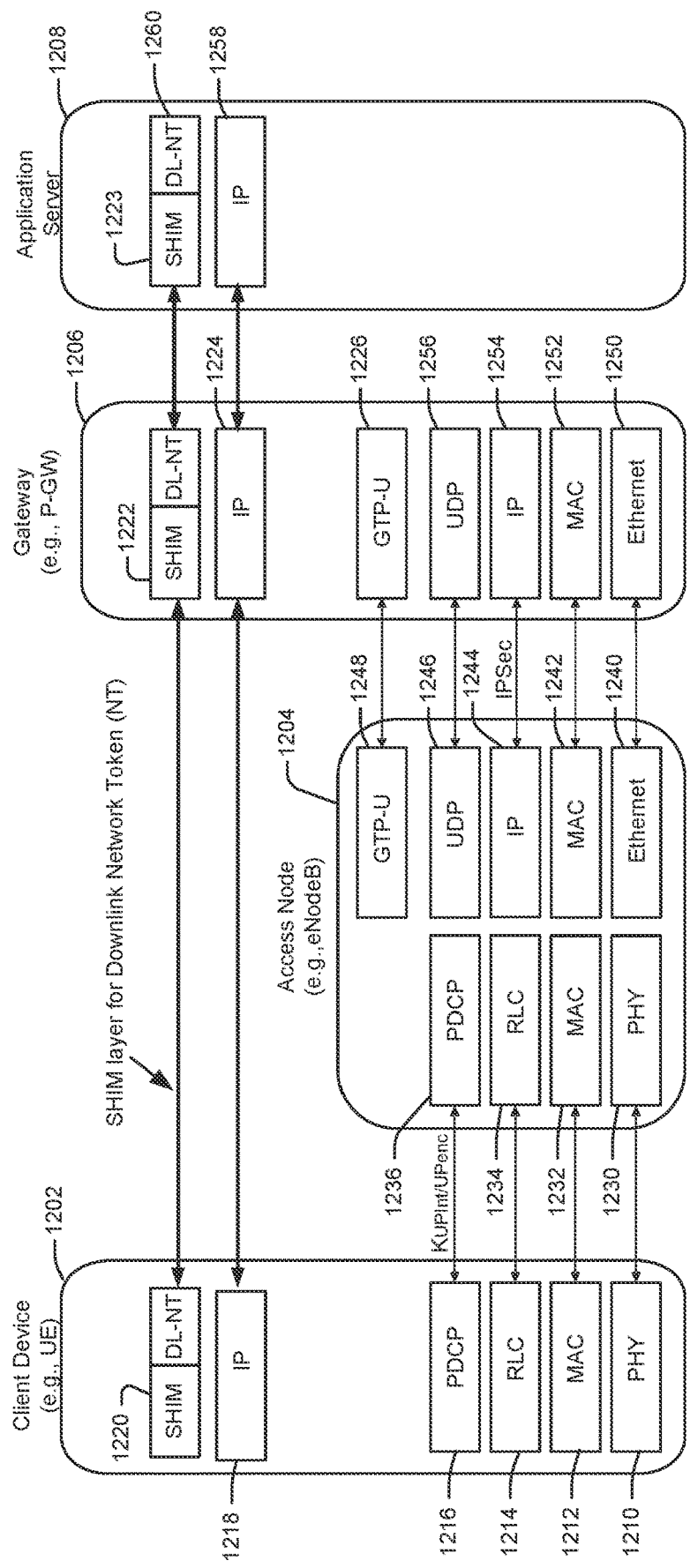
FIG. 12 is an exemplary illustration of user-plane protocol stacks of a system in accordance with another aspect described herein.

FIG. 12 is an exemplary illustration of user-plane protocol stacks 1200 of a system in accordance with another aspect described herein. In the user-plane protocol stacks 1200 of FIG. 12, shim layers 1220, 1222, 1223 were added for network token transport. FIG. 12 depicts a client device 1202, an access node 1204, a gateway device 1206, and an application server 1208.

The aspect illustrated by FIG. 12 may be useful for movement of a downlink network token 1260 from the application server 1208 toward the client device 1202 via the gateway device 1206. In some aspects, the downlink network token may be transported from the application server 1208 to the gateway device 1206, but not transported to the client device 1202. By way of example, the application server 1208 may receive a downlink network token 1260 from the gateway device 1206 via user-plane messaging.

In the exemplary illustration FIG. 12, a protocol stack of the client device 1202 may include, from lowest layer upward, a physical (PHY) layer 1210, a medium access control (MAC) layer 1212, a radio link control (RLC) layer 1214, a packet data convergence protocol (PDCP) layer 1216, un Internet Protocol (IP) layer 1218, and a shim layer 1220.

In one aspect, the shim layer 1220 may be added to the protocol stack of the client device 1202, a corresponding shim layer 1222 may be added the protocol stack of the gateway device 1206, and still another corresponding shim layer 1223 may be added the protocol stack of the application server 1208. Shim layer 1220, corresponding shim layer 1222, and corresponding shim layer 1223 may facilitate movement of network tokens between the client device 1202, gateway device 1206, and application server 1208 in accordance with aspects described herein. In one aspect, the shim layer 1220 lies above the IP layer 1218 of the client device 1202. In this aspect, corresponding shim layer 1222 lies above the IP layer 1224 of the gateway device 1206 and corresponding shim layer 1223 lies above the IP layer 1258 of the application server 1208.

The aspect illustrated by FIG. 12 may be useful for movement of a downlink network token 1260 between the application server 1208 and the gateway device 1206. If it is necessary to transport the downlink network token to the client device 1202, the aspect illustrated by FIG. 12 provides for such transport without a need for any processing by the access node 1204.

By way of example, during enforcement operations, the gateway device 1206 may receive a downlink network token from the application server 1208 in one or more user-plane messages. A shim header may carry the downlink network token 1260 to the gateway device 1206.

If verification of the downlink network token 1260 at the gateway device 1206 is successful, the gateway device 1206 may forward a packet associated with the downlink network token 1260 to the client device 1202. The gateway device may discard the downlink network token 1260 prior to forwarding the packet to the client device 1202. If verification of the downlink network token 1260 at the gateway device 1206 is not successful, the gateway device 1206 may discard the packet and downlink network token 1260.

The layers of the user-plane protocol stacks of the client device 1202, access node 1204, gateway device 1206, and application server 1208 that were not described in connection with FIG. 12 will not be described as their descriptions are the same or similar to those of like named layers in FIG. 9.

Exemplary Device

Figure 13:
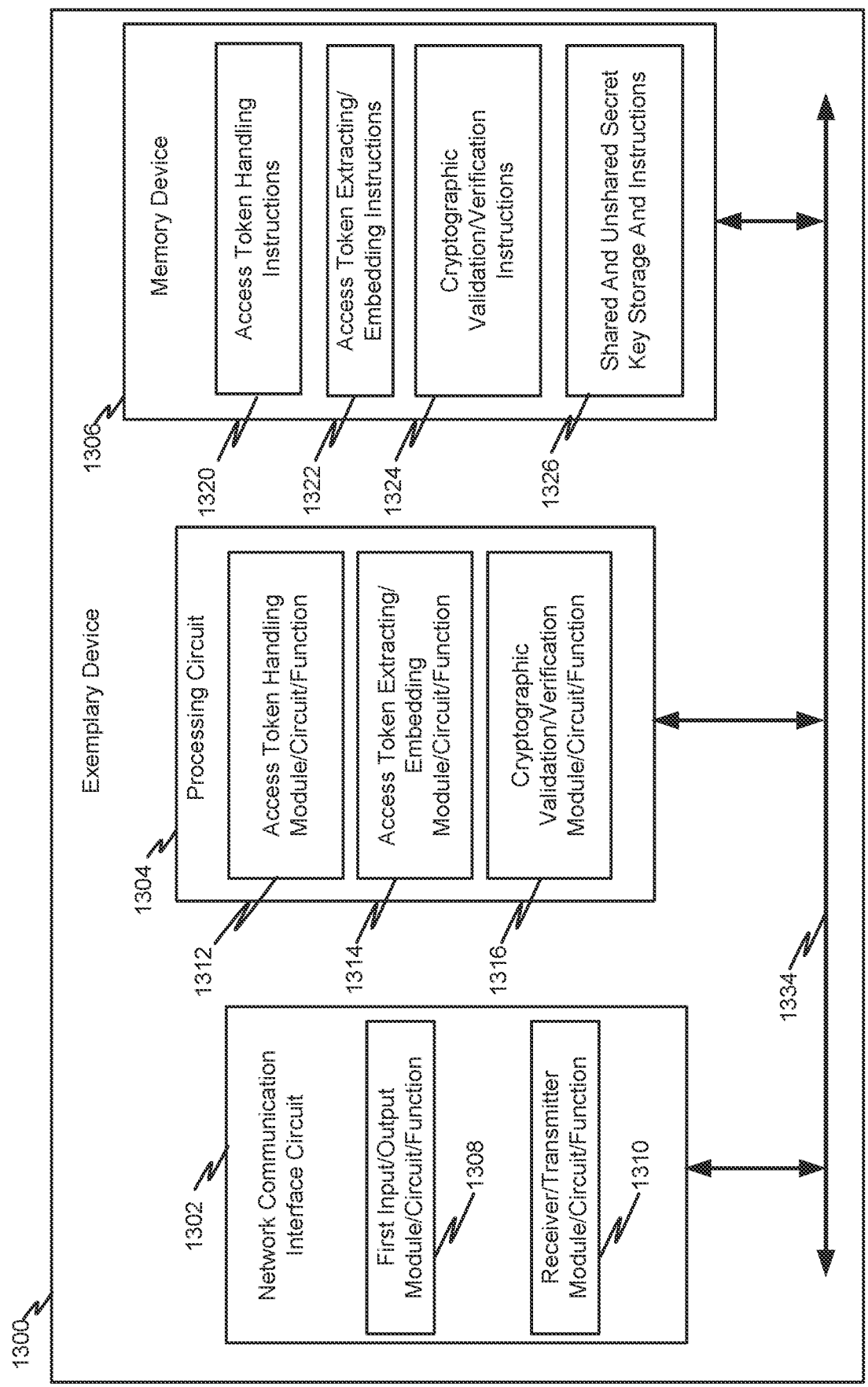
FIG. 13 is a block diagram illustrating an exemplary device configured to support network policy enforcement and/or packet steering using network tokens in accordance with aspects described herein.

FIG. 13 is a block diagram illustrating an exemplary device 1300 configured to support network policy enforcement and/or packet steering using network tokens in accordance with aspects described herein. As used herein, the term "device" may describe a chip component and/or an end user device such as a client device (e.g., mobile device, user equipment, user device). In one example, the device 1300 may include a network communication interface circuit 1302 for communicating over a wireless network, a processing circuit 1304 coupled to the network communication interface circuit 1302, and a memory device 1306 coupled to the processing circuit 1304. This list is non-limiting.

The network communication interface circuit 1302 for communicating over a wireless network may include a first input/output module/circuit/function 1308 for input/output operations with a user. The network communication interface circuit 1302 may include a receiver/transmitter module/circuit/function 1310 for wireless communication with access nodes. This list is non-limiting.

The processing circuit 1304 may include or implement one or more processors, application specific processors, hardware and/or software modules, etc., that are configured to support token based application access. For example, a network token handling module/circuit/function 1312 may be configured to derive tokens based on an unshared secret key, or a shared secret key, that may be stored in the memory device 1306. By way of another example, a network token extracting/embedding module/circuit function 1314 may be configured to extract network tokens from uplink packets from a device and/or embed (include) network tokens in downlink packets sent to a gateway device. By way of still another example, a cryptographic validation/verification module/circuit/function 1316 may be configured to validate/verify network tokens received, for example, with packets. This list is non-limiting.

The memory device 1306 may be configured to include network token handling instructions 1320, network token extracting/embedding instructions 1322, cryptographic validation/verification instructions 1324, and shared and unshared secret key storage and instructions 1326. This list is non-limiting.

Communication between network communication interface circuit 1302, processing circuit 1304, memory device 1306, and other components (not shown) of device 1300 may be through a communication bus 1334.

Methods Operational at a Device

Figure 14:
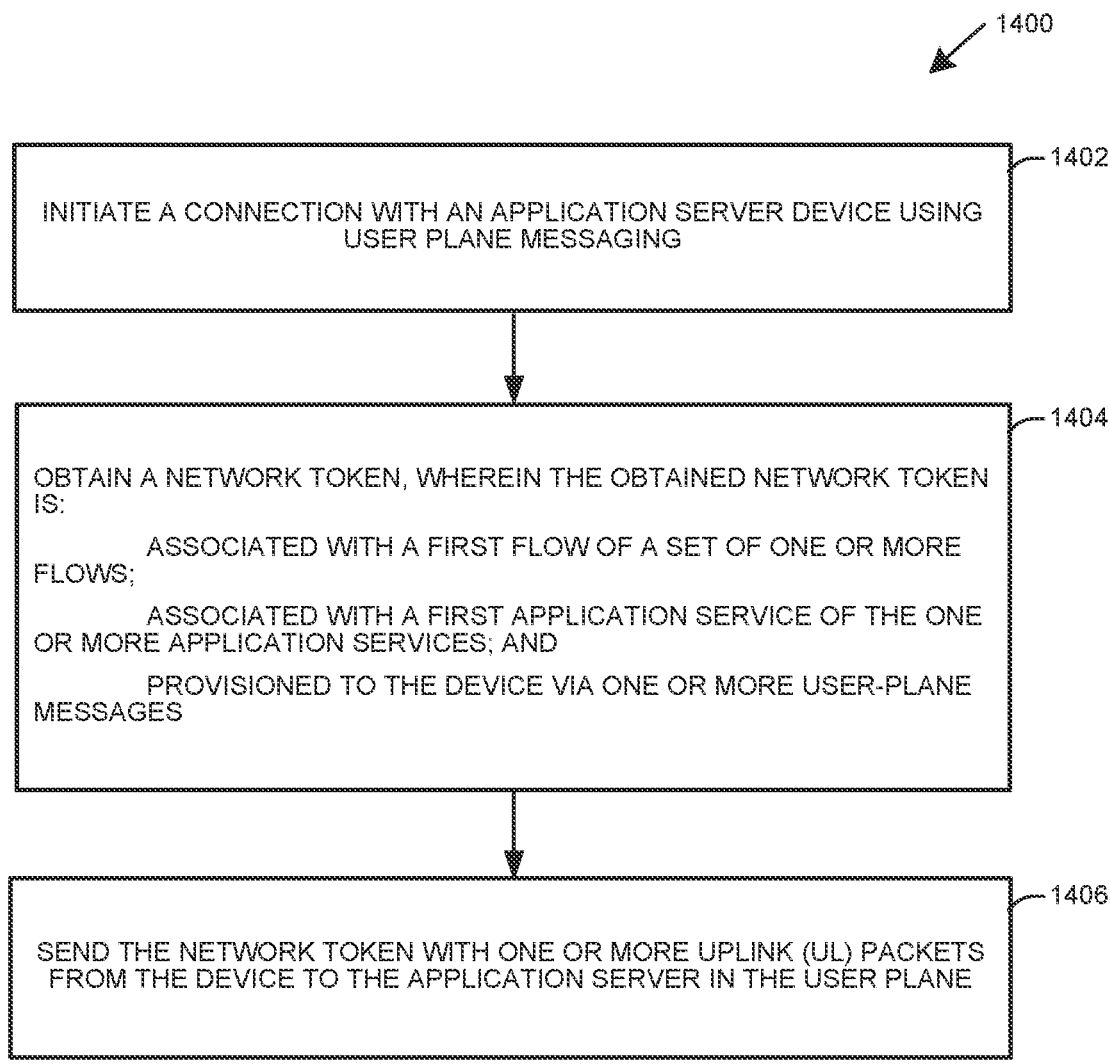
FIG. 14 is an exemplary method through which a device (e.g., chip component, client device) may initiate a request to communicate with an application server and utilize network tokens in connection with the communication.

FIG. 14 is an exemplary method 1400 through which a device (e.g., chip component, client device) may initiate a request to communicate with an application server associated with one or more application services and utilize network tokens in connection with the communication. The network tokens may be used for network policy enforcement and data packet steering (e.g., steering user data message related packets). The network tokens may be used for validating and mapping application service transmissions between the application server and the device. The method 1400 may be operational at the device. The method 1400 may apply to a case in which the device initiates the request to use the network token. The network tokens may be uplink (UL) network tokens, downlink (DL) network token, or both UL, and DL network tokens.

In one aspect, the device may initiate 1402 a connection with an application server associated with one or more application services using user-plane messaging.

In response to initiating the connection, the device may obtain 1404 a network token from the application server. The network token may be associated with a first flow ism a set of one or more flows. The network token may be associated with a first application service of the one or more application services. The network token may be provisioned to the device via one or more user-plane messages.

After receiving the network token, the device may include 1406 the network token with one or more uplink (UL) packets subsequently sent from the device to the application server in the user-plane. According to some aspects, the device may include the network token with every uplink (UL) packet subsequently sent from the device to the application server in the user-plane.

The network token may be derived bay a gateway device (e.g., P-GW) of a core network. That is, according to some aspects, the application server provides the network token to the device; however, the application server did not derive the network token. According to the aspects described herein, the network token may be derived by the gateway device and sent to the application server. This may permit delivery of the network token to the device, in the user-plane, from the application server. The network token may be embedded in, or otherwise included with, a packet. In some aspects, the network token may be distributed among one or more packets.

According to some aspects, the network token reflects a policy enforced by the core network with respect to the device. According to some aspects, a gateway device in a core network may derive the network token based on a device subscription profile of the device maintained by the core network and/or a policy of the first application service.

The device subscription profile may be stored in a subscription profile repository (SPR). The PCRF may communicate with the SPR. In other words, the PCRF may request the subscription profile of a user and/or a device from the SPR. The network token may reflect a policy enforced by the core network with respect to the subscription profile. For example, the policy may include a specific QoS requirement for voice traffic or realtime media traffic.

In accordance with various aspects described herein, initiating the connection may include sending a connection request and the connection request may include an explicit request for the network token. According to other aspects, initiating the connection may include sending a packet representative of an implicit request for the network token.

To ensure reception of a network token in response to a request for the network token, either explicit or implicit, the process of initiating the connection may include sending a packet that requires an acknowledgment from the application server, wherein the acknowledgment transports the network token to the device. Therefore, according to one aspect, the network token may be included in an acknowledgment packet received by the device. For example, the packet may be a transmission control protocol synchronize (TCP SYN) packet. In accordance with this aspect, the network token, received by the device, may be included in a TCP SYN acknowledgment (ACK) packet received by the device.

The implicit request for the network token may be recognized in several ways. In accordance with one aspect, the implicit request may be recognized, for example, by recognition of an operator's policy that requires packets from a given application server to carry network tokens (e.g., DL network tokens). In accordance with one aspect, the implicit request may be recognized when a device first seeks to connect with an application server. In such an aspect, a P-GW may determine that an implicit request is made when it detects a first packet directed to the application server from a device (e.g., chip component, client device). In accordance with another aspect, the implicit request may be encompassed in the transmission of a packet that includes a destination address or destination address prefix of an application server that requires network tokens (where the P-GW recognizes that the destination application server requires use of network tokens). By way of further example, an implicit request for the first network token may be established based on an application identifier (App ID) included with the packet sent from the device (where the P-GW recognizes that the application service, application server, or application associated with the application identifier requires use of network tokens). In some aspects, new signaling (for example in the control-plane) may not be required to implement the explicit and/or implicit use of a network token.

Once the device receives the network token, there may be several ways to transport the network token, in association with uplink data packets, to the P-GW for enforcement purposes. According to one aspect, the network token may be transported from the device to a packet data network (PDN) gateway (P-GW) in a user-plane shim header. The user-plane shim header may be located above an Internet Protocol (IP) layer. Alternatively, the user-plane shim header may be located below an Internet Protocol (IP) layer. According to another aspect, the network token may be transported from the device to a packet data network (PUN) gateway (P-GW) in an Internet Protocol (IP) extension header as defined in IP version 6 (IPv6). According to another aspect, the network token may be transported from the device to an access node in a packet data convergence protocol (PDCP) layer. The network token may then be copied to a general packet radio service (GPRS) tunneling protocol (GTP) layer for the user-plane (GTP-U) header in the access node. The network token may then be transported from the access node to the packet data network (PDN) gateway (P-GW) in the GTP-U layer.

In one aspect, the network token may be associated with a bearer and/or a data flow. The network token may be bound to an application server, an application service, and/or the device. In one aspect, a request to initiate an application service may include an application identifier (App ID) to identify an application server or application service that is a destination of the request. In such an aspect, or in any other aspect, the network token may be bound to an application server, an App ID, and a device. As used herein, the term "bound" (as in "a token is 'bound' to a parameter") indicates that the token (i.e., DL token) may be derived using a function that includes, but is not limited to, the named bound parameter(s). It will be understood that the function is not limited to the named parameters. By way of example, a DL token may be bound to an application server and a device (i.e., the token is specific to an identified application server and an identified device); however, the equation used to derive the DL token may include parameters in addition to those that specifically identify the application server and/or device. It will be understood that the parameters recited herein, in connection with examples of equations used to derive a network token are not intended to be exhaustive or limiting.

The DL token may be derived using a function with a set of input parameters including, for example, a secret key, a Policy Identifier, source Internet Protocol (IP) address, source port number, destination IP address, destination port number, protocol identifier (ID), App ID, priority, and/or a quality of service class identifier (QCI). In one example, the DL token may include the result of the function and a concatenation of some of the just listed parameters and/or other parameters, such as a key identifier (KeyID) that identifies the key used for DL token derivation. The DL token may include a class index (CI) that defines fields used for token derivation or a list of input parameters used to derive the token. In some aspects, the secret key (e.g., KP-GW, FIGS. 4 and 5) may be known only to the gateway device.

In one aspect, the key identifier may define the secret key used for token derivation. The key identifier may change periodically or in accordance with an instruction from the P-GW. Only the gateway device may know the secret key. In some aspects, a P-GW may have multiple keys for token derivation. If a P-GW changes the token derivation key, two keys may be valid at the same time. Accordingly, the key identifier can be used to avoid immediate token revocation in such a scenario.

The class index (CI) may define fields used for token derivation or define a list of input parameters used to derive the token.

In one aspect, the DL token may be a concatenation of the key identifier, the class index (CI), a Policy Identifier, and an output of the function used in connection with derivation of the DL token. In some aspects, the function may be a secure hash function, such as a secure hash algorithm (SHA), such as SHA-1, SHA-2, or SHA-3. In other embodiments, the function may be a hash message authentication code (HMAC) function. In still other embodiments, the function may be a message authentication code (MAC) derivation function. The MAC derivation function may include a cipher block chaining message authentication code (CBC-MAC) function, a cypher-based MAC (CMAC) function, or a Galois message authentication code (GMAC) function The P-GW may also derive a connection identifier that may be used by the P-GW to identify the device or application server that originated the explicit or implicit request for the DL token. The connection ID may be derived, before, during, or after the derivation of the DL token. The connection ID may remain with the P-GW and may be useful only to the P-GW. The connection ID may be stored in temporary storage (e.g., a cache 428, FIG. 4) of the P-GW. A cache may be an appropriate storage location because the connection ID may only be useful during a time when the application server and device are exchanging packets in connection with a given interchange. Once the service between the application server and the device is terminated, or after a predetermined amount of time or some other triggering event, the connection ID can be removed from storage in the P-GW (e.g., overwritten or erased from the cache of the P-GW).

The P-GW may use the DL token to enforce downlink traffic policies including downlink policies related to user-plane messages. Enforcement may be performed by, for example, verifying the DL token received in a given packet from the application server, and using the information obtained from the DL token to forward the packet to the appropriate device. The packet forwarded to the appropriate device may or may not include the DL token. The P-GW may also verify the connection ID (if previously derived).

The network token may be a secure way to validate and map application service transmissions between an application server and a device at a network. Use of the network token for such a purpose provides greater security than only adding an application server ID to a packet. In addition, as noted above, a network token may comprise one or more of a secure hash that is used for the validation, an index that is used to determine how the secure hash is used for the validation, and/or a policy that is used to determine how to process the packet after the packet is validated.

As an optional step, the device may establish or initiate a connection with a second application server. Thereafter, the device may optionally obtain a second network token, different from the first network token, from the second application server. The first application server and the second application server may be associated with an application service or a destination IP address. Additionally or alternatively, the first application server and the second application server may be associated with a first application service and a second application service.

Figure 15:
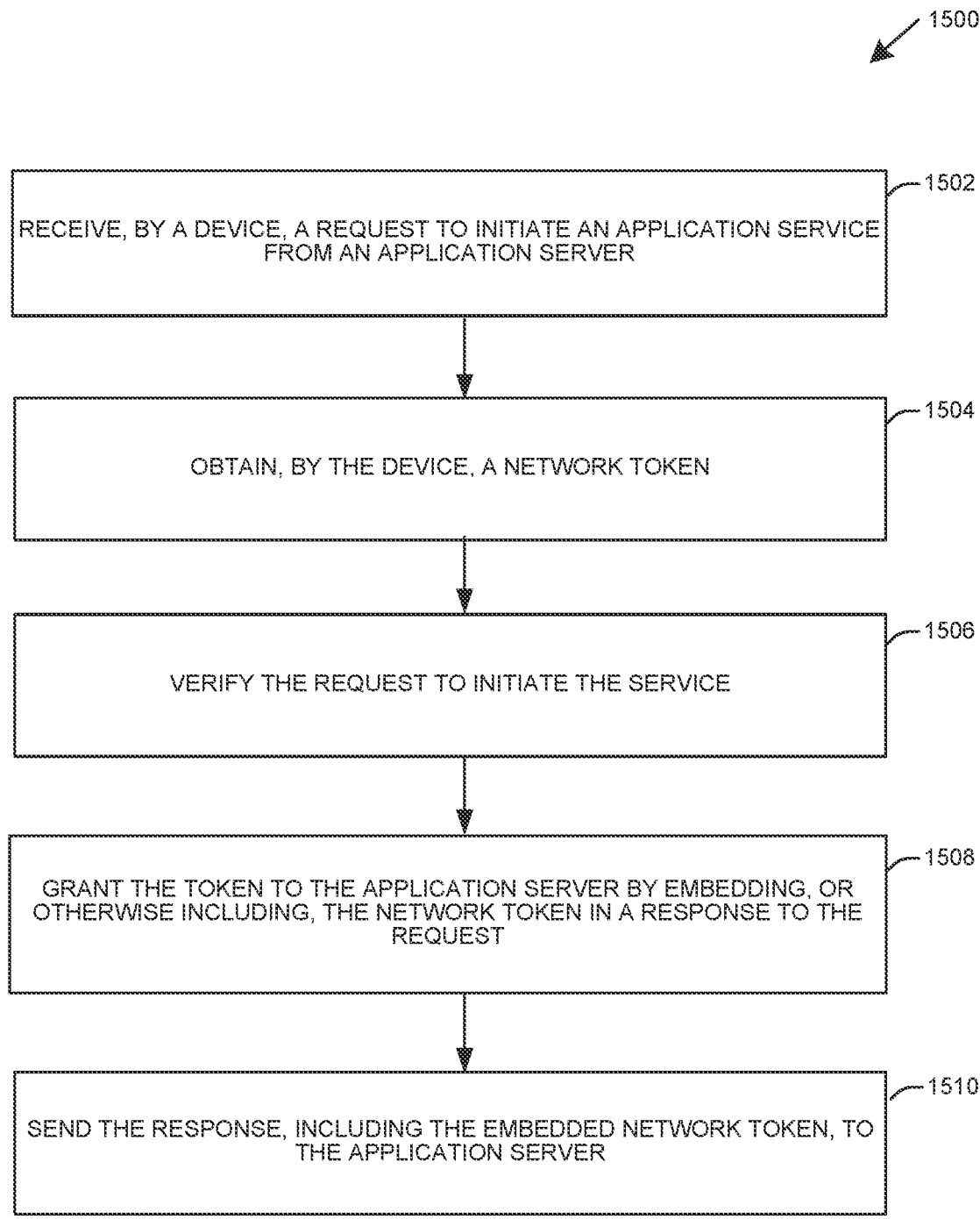
FIG. 15 is an exemplary method through which a device (e.g., chip component, client device) may respond to a request to initiate communication and utilize network tokens in connection with the communication.

FIG. 15 is an exemplary method 1500 through which a device (e.g., chip component, client device) may respond to a request to initiate communication and utilize network tokens in connection with the communication. The request to initiate communication may include a request to utilize a network token. The method 1500 may be operational at the device. The method 1500 may apply to a case in which an application server has initiated the request to initiate communication and/or the request to utilize the network token.

The request to initiate communication (e.g., a request to initiate an application service) may come from an application server. The request, for example an application service request, may include an explicit request to utilize the network token. Alternatively, the request to utilize the network token may be implicit. The request may include an application identifier (App ID) to identify the application server or service that initiated the request.

In one aspect, the device may receive 1502 the request to initiate an application service from an application server. The device may obtain 1504 a network token. In one aspect, the network token may be obtained from a gateway (e.g., a P-GW). The device may verify 1506 the request to initiate the application service (e.g., based on IP address, device ID, or Application Credential).

The device may grant the network token to the application server by embedding, or otherwise including, 1508 the network token in a response to the request to initiate the application service. The network token may be embedded in a packet comprising the response to the request to initiate the application service. In one aspect, the network token may be distributed among a plurality of packets, which, for example, may comprise some or all of the response to the request to initiate the application service.

The device may then send 1510 the response, including the embedded network token, to the application server. In this way, the application server may be provided with the network token and can, in turn, embed, or otherwise include, a copy of the network token into one or more packets being sent in the downlink direction from the application server to the device. In some aspects, the application server may embed, or otherwise include, a copy of the network token into every packet being sent in the downlink direction from the application server to the device.

In some aspects, the network token may be a downlink network token. The network token may be received at the device from a gateway device (e.g., a P-GW). In some aspects, the DL token may be embedded in, or otherwise included with, a packet received from the gateway device. The packet may be sent in a user-plane.

The network token may be bound to the application server and the device or may be bound to the application server, an application service, and the device. In one aspect, the DL token may be associated with a bearer or a data flow. The DL token may be used for verification of downlink packets and for mapping the downlink packet received in a downlink flow to a bearer.

Without regard to whether the device or the application server initiates the request to establish communication, the request may be a transport layer request or an application layer request. The packet in an initial request may be a transmission control protocol synchronize (TCP SYN) packet. If the packet in the initial request is a TCP SYN packet, the first network token may be carried to the device or the application server in a TCP SYN acknowledgment (ACK) packet.

The request to utilize the network token may be an explicit request or an implicit request. The explicit request may be embedded in a request sent from (or to) the application server in the user-plane. The implicit request may be recognized, for example, by virtue of sending an initial message from the application server to the device (or vice versa). That is, a system may be prepared to recognize a need to use network tokens whenever a new communication service is established. By way of further example, initiating the service may include sending a packet that represents an implicit request for the first network token, where the implicit request may be recognized as being the transmission of a first packet directed to the application server (or to the device). By way of further example, initiating the service may include sending a packet that represents an implicit request for a network token, where the implicit request may be recognized as being the transmission of a packet that includes a destination address or at least a destination address prefix of an application server that requires network tokens (where, for example, a P-GW recognizes that the destination application server requires use of network tokens). By way of further example, establishing or initiating the service may include sending a packet that represents an implied request for the first network token, where the implicit request may be recognized based on the application identifier (App ID) included with the packet. In some aspects, new signaling (for example in the control-plane) may not be required to implement the explicit and/or implicit use of a token request implemented through user-plane messaging.

In one aspect, the network token may be received in a user-plane shim layer header. The user-plane shim layer may be located above an Internet Protocol (IP) layer in a user-plane protocol stack. Alternatively, the user-plane shim layer may be located below an Internet Protocol (IP) layer in a user-plane protocol stack.

In one aspect, the network token may be embedded in an IP header, such as an IP version 4 (IPv4) header or an IP version 6 (IPv6) header. The IP header in IPv4 may be an IP Options Field. The IP header in IPv6 may be an IP extension header.

In one aspect, the network token may be embedded in a Transmission Control Protocol (TCP) header. The network token may be embedded in an Options field of the TCP header.

In one aspect, the network token may be embedded in a Transport Layer Security (TLS) record header.

In one aspect, the network token may be embedded in a shim header between an IP header and a Transmission Control Protocol/User Datagram Protocol (TCP/UDP) header.

In still another aspect, the network token may be embedded in a Hypertext Transfer Protocol (HTTP) header. The HTTP header may be an HTTP eXperimental or eXtension header.

Exemplary Gateway Device

Figure 16:
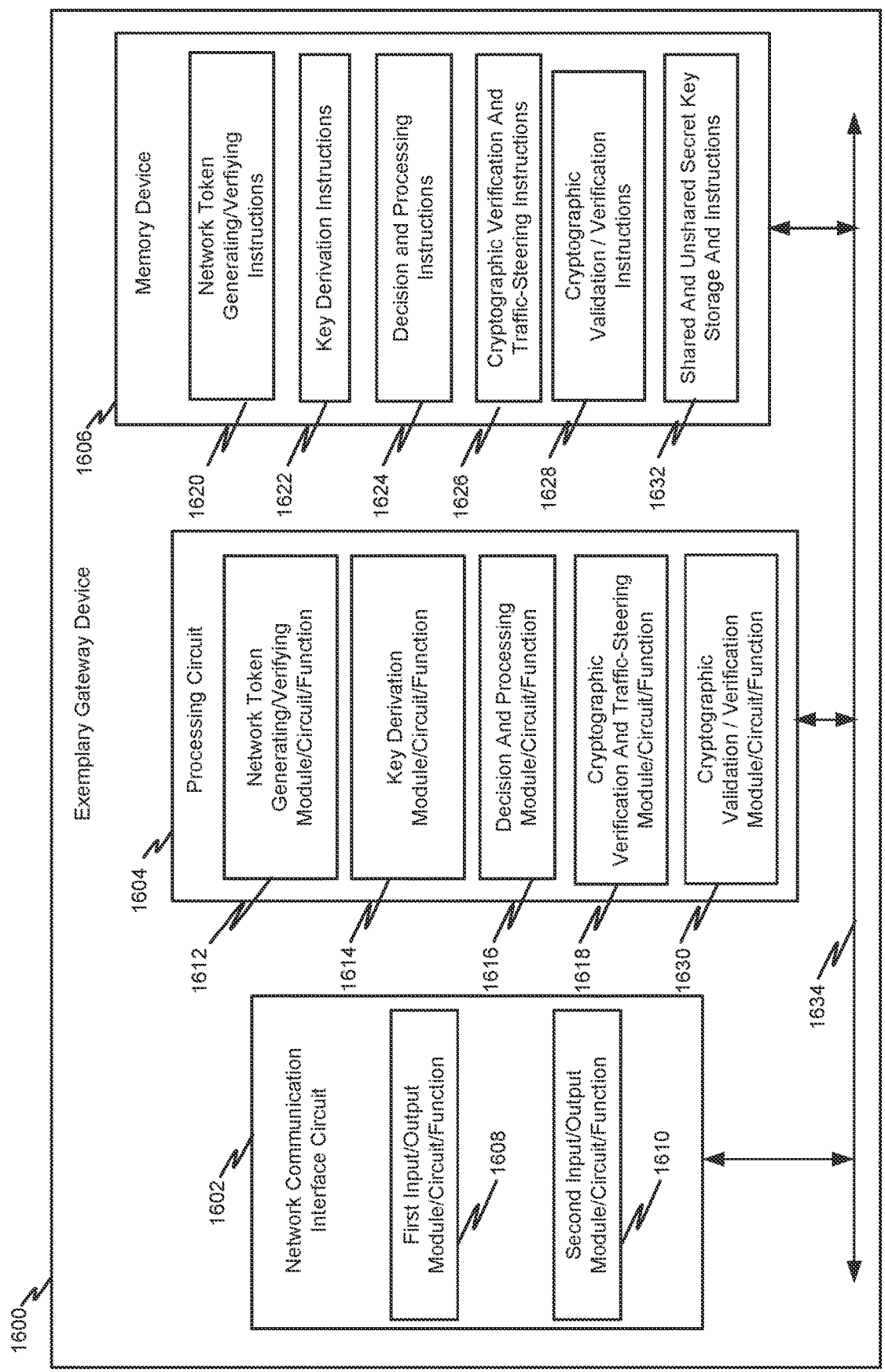
FIG. 16 is a block diagram illustrating an exemplary gateway device configured to support network policy enforcement and/or packet steering using network tokens in accordance with aspects described herein.

FIG. 16 is a block diagram illustrating an exemplary gateway device 1600 configured to support network policy enforcement and/or packet steering using network tokens in accordance with aspects described herein. In one example, the exemplary gateway device 1600 may include a network communication interface circuit 1602 for communicating over a wireless network, a processing circuit 1604 coupled to the network communication interface circuit 1602, and memory device 1606 (e.g., magnetic and/or optical device to store data) coupled to the processing circuit 1604. This list is non-limiting.

The network communication interface circuit 1602 for communicating over the wireless network may include a first input/output circuit/function/module 1608 for communication with a serving gateway and a second input/output circuit/function/module 1610 for communication with a packet data network. The first input/output circuit/function/module 1608 may handle multiple IP flows established on multiple bearers. The second input/output circuit/function/module 1610 may handle multiple IP flows with multiple servers on the packet data network. This list is non-limiting.

The processing circuit 1604 may include or implement one or more processors, application specific processors, hardware and/or software modules, etc., that are configured to support token based application access. For example, a network token deriving/verifying circuit/function/module 1612 may be configured to derive tokens based on a secret key that may be stored in the memory device 1606. Only the gateway device may know the secret key. By way of another example, a key derivation circuit/function/module 1614 may be configured to derive a secret key specific to an access node based on, for example, the secret key that may be stored in the memory device 1606 and an identifier of a given access node. By way of yet another example, a decision and processing circuit/function/module 1616 may be configured to decide if uplink packets received from EPS bearers (or more generally received from devices) and/or downlink packets received from application servers, include network tokens and if so, may be further configured to pass the received packets to a cryptographic-validation and traffic-steering circuit/function/module 1618. By way of still another example, a cryptographic validation/verification module/circuit/function 1630 may be configured to validate/verify network tokens received, for example, from devices or application servers. The decision and processing circuit/function/module 1616 may be further configured to pass received packets that do not include network tokens to a service data flow filter bank (not shown). This list is non-limiting.

The memory device 1606 may be configured to include network token deriving/verifying instructions 1620, key derivation instructions 1622, decision and processing instructions 1624, cryptographic-validation and traffic-steering instructions 1626, and shared and unshared secret key storage and instructions. This list is non-limiting.

Communication between network communication interface circuit 1602, processing circuit 1604, memory device 1606, and other components (not shown) of exemplary gateway device 1600 may be through a communication bus 1634.

Methods Operational at a Gateway Device

Figure 17:
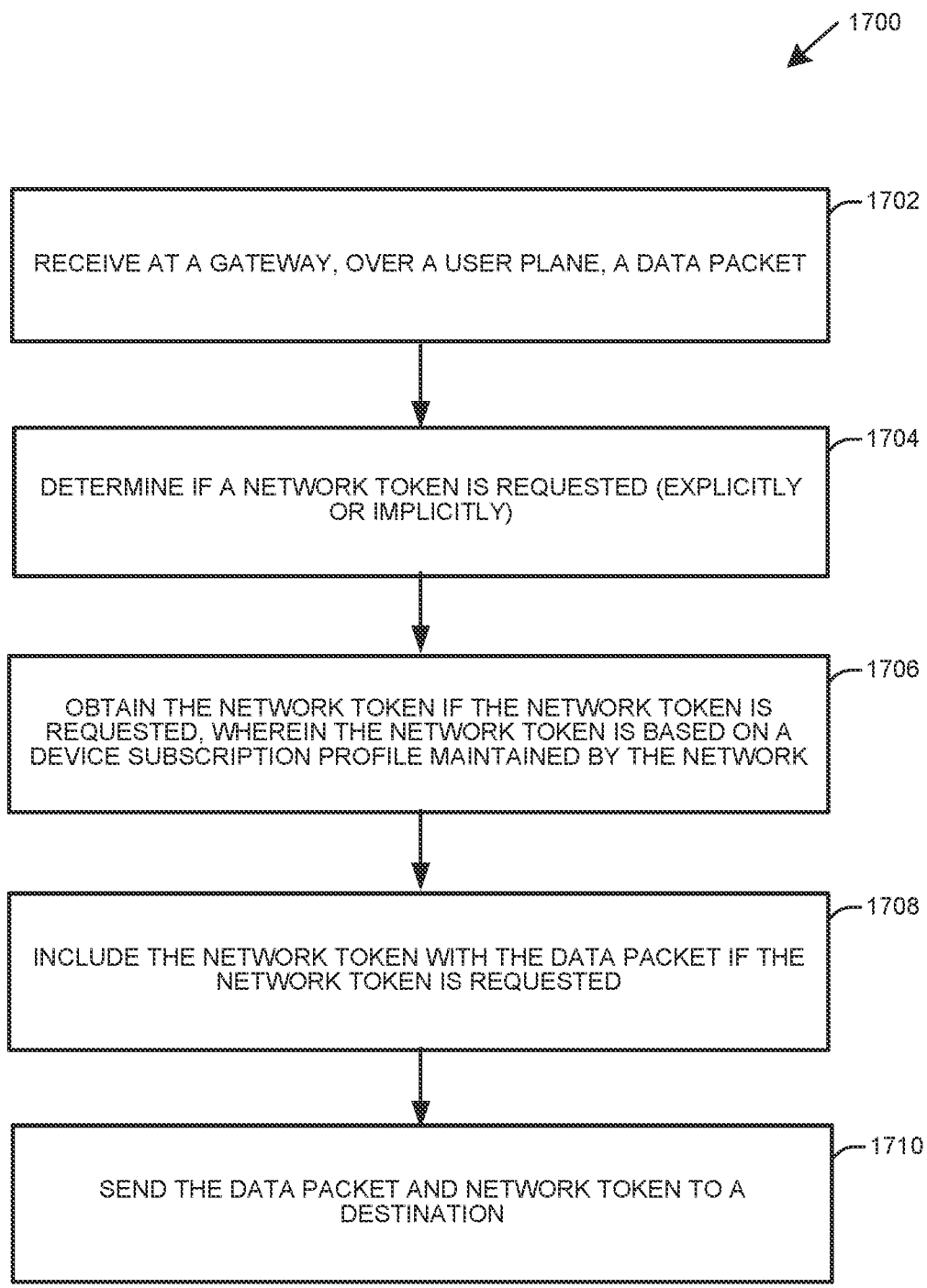
FIG. 17 illustrates an exemplary method operational at a gateway device (e.g., a P-GW) for detecting a request from a device, via user-plane messaging, for use of a network token, deriving the network token, and provisioning the network token to the requesting device via an application server in accordance with an aspect described herein.

FIG. 17 illustrates an exemplary method 1700 operational at a gateway device (e.g., a P-GW) for detecting a request from a device, via user-plane messaging, for use of a network token, deriving the network token, and provisioning the network token to the requesting device via an application server in accordance with an aspect described herein.

According to one aspect, a method, operational at a gateway device (e.g., P-GW) in a network may include receiving 1702 at the gateway device, over a user-plane, a data packet. The gateway device may then perform steps for determining 1704 if a network token is requested (e.g., explicitly or implicitly). If a network token is requested, the gateway device may obtain 1706 the network token. The network token may be based on a device subscription profile maintained by the network.

According to one aspect, the network token may obtained by deriving it locally at the gateway device. According to aspects described herein, the network token may be derived by the gateway device based on a device subscription profile maintained by the core network associated with the gateway device. The device subscription profile may be stored in a subscription profile repository (SPR). The network token may reflect a policy enforced by the core network with respect to the device. In other words, the network token need not reflect a policy of an application server. The network token may be derived and used by the gateway device on behalf of the network and for purposes of the network.

Once the gateway device obtains the network token, the gateway device may perform steps necessary to include 1708 the network token with the data packet. The gateway device may then send 1710 the data packet and network token to a destination.

In some aspects, the data packet is to be sent to an application server and the network token is an uplink network token. In some aspects, the data packet is to be sent to an application server and the network token is a downlink network token. In some aspects, the data packet is to be sent to a device and the network token is a downlink network token. In some aspects, when the data packet is to be sent to a device and the network token is a downlink network token, the method may further comprise receiving a second packet including the downlink network token from the device and sending the second packet and the downlink network token to the application server. In this latter aspect, an application server may have requested the downlink network token; the requested downlink network token would be sent to the device from the gateway; the gateway would subsequently receive a data packet from the device including the downlink network token; and the gateway would send that copy of the downlink network token to the application server that originally requested the downlink network token. In still other aspects, the network token could be an uplink network token and a downlink network token, the uplink network token being different from the downlink network token. In such an aspect, the gateway device may derive both the uplink network token and downlink network token and send both to a destination.

As indicated above, the gateway device may be a packet data network (PDN) gateway (P-GW).

The step of determining if a network token is requested may depend on whether the packet includes an explicit request for the network token or whether the packet represents (e.g., is representative of) an implicit request for the network token. According to some aspects, determining if the network token is requested is based on determining if the application server to which the packet is to be sent requires network tokens. If the application server to which the packet is to be sent requires network tokens, then the gateway device may obtain the network token. Other tests for implicit indications to determine a need for a network token are acceptable.

If a network token is requested, the gateway device may obtain the network token. According to one aspect, obtaining the network token is achieved by deriving the network token at the gateway device. The network token may be derived using a function having a set of input parameters including a secret key known to the gateway device, a class index, a source Internet Protocol (IP) address, source port number, destination IP address, destination port number, protocol identifier (ID), application ID, priority, and/or a quality of service class identifier (QCI). The class index may define fields used for network token derivation.

According to one example, provided above and reproduced below for convenience, the network token may be derived as:

Network Token=CI|HMAC (KP-GW,
CI|IPC|PS|PC|PS|Proto|App ID| . . . ), where CI is the class index that defines the fields used for token derivation. HMAC is a keyed-hash message authentication code, $K_{P\text{-}GW}$ is a secret key of P-GW, $IP_C$ is the client (e.g., device) IP address, $P_C$ is the client port number. $IP_S$ is the server (e.g., destination or application server) IP address, $P_S$ is the server port number, and Proto is the protocol number or identifier, and App ID is an application identifier. Additional or alternate parameters may include a priority and/or a quality of service class identifier (QCI).

As shown in the example above, the network token may be a concatenation of the class index and an output of the exemplary function. According to some aspects, the function may be a hash message authentication code (HMAC) function. According to some aspects, the function may be a message authentication code (MAC) derivation function. The MAC derivation function includes a cipher block chaining message authentication code (CBC-MAC) function, a cypher-based MAC (CMAC) function, or a Galois message authentication code (GMAC) function. Other formulae for derivation of the network token may be acceptable.

Figure 18:
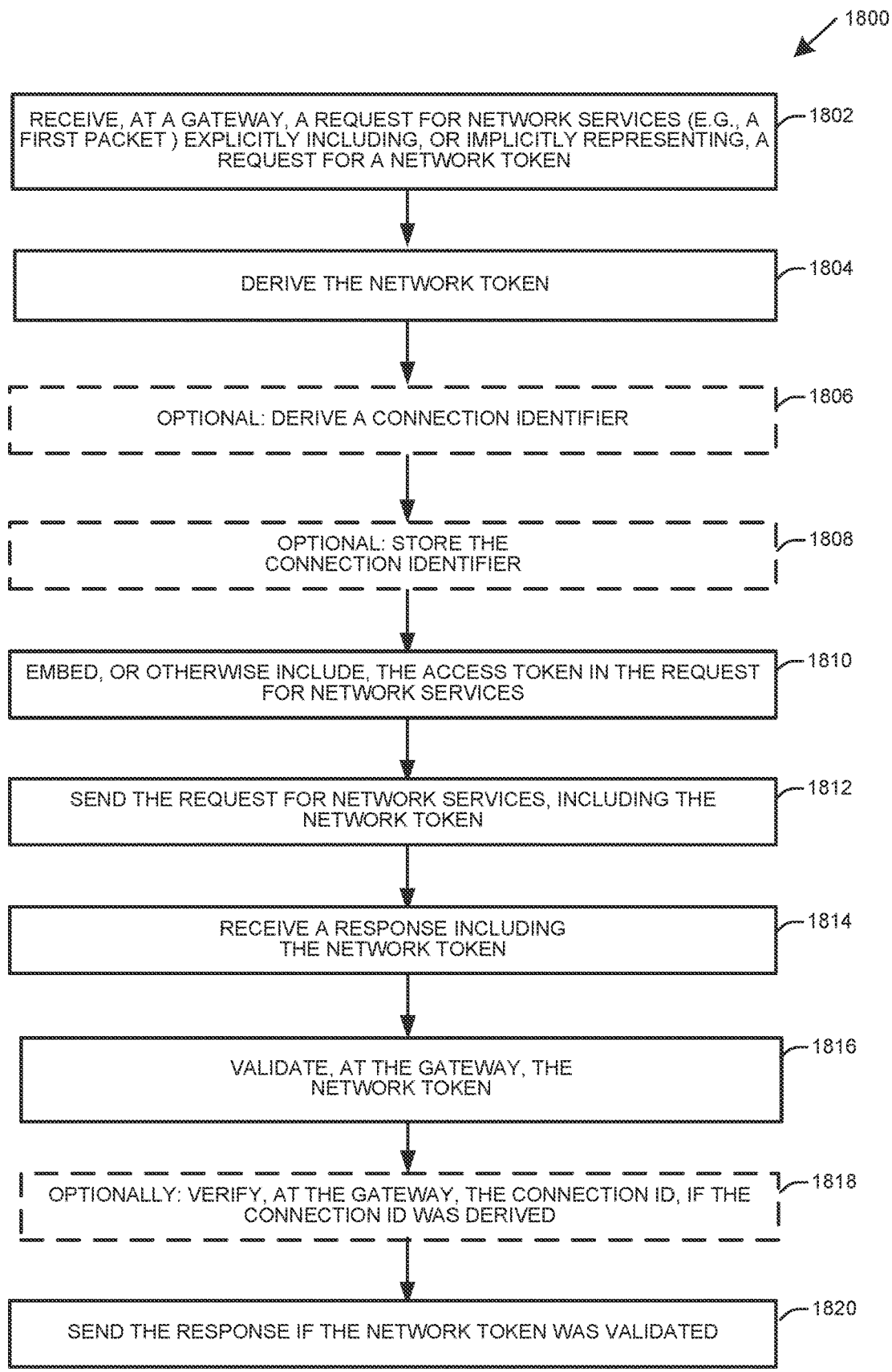
FIG. 18 illustrates an exemplary method operational at a gateway device (e.g., a P-GW) of setting up and using a network token at a gateway device (e.g., a P-GW) via user-plane messaging in accordance with an aspect described herein.

FIG. 18 illustrates an exemplary method 1800 operational at a gateway device (e.g., a P-GW) of setting up and using a network token at a gateway device (e.g., a P-GW) via user-plane messaging in accordance with an aspect described herein.

In one aspect, a method of setting up a network token may include receiving 1802, at the gateway device, a request for network service (e.g., a first packet). The request for network service may explicitly include, or implicitly represent, a request for a network token. The request for network service may be received from a client device (e.g., in an uplink data flow) or from an application server (e.g., in a downlink data flow). The gateway device may derive 1804, in response to the request for the network token, an uplink network token, a downlink network token, or both an uplink network token and a downlink network token as appropriate to the request.

Optionally, the gateway device may also derive 1806 a connection identifier that may identifies the client device or application server that initiated the connection associated with the network token. If derived, the connection identifier may optionally be stored 1808 at the gateway device. Storage, for example, may be in a cache of the gateway device.

The gateway device may embed, or otherwise include, 1810 the network token in a packet to be sent to either a device or an application server. In one aspect, the packet may be associated with a request for an application service. The gateway device may send 1812 the request for the application service, including the embedded/included network token, to either the device or the application server.

Subsequently, the gateway device may receive 1814 a packet including the previously derived (or a copy of the previously derived) network token. Continuing with the non-limiting example of the request for an application service (e.g., a service initiation request), the received packet may be associated with a service initiation response. The gateway device may validate the received packet by validating 1816 the network token. Optionally, if previously derived, the gateway device may validate 1818 the connection IIS. The gateway device may send 1820 the initiation response to its destination if the network token was validated. In some aspects, the gateway device may include the network token with the initiation response. In other aspects, the gateway device may discard the network token, so that the network token is not included with the initiation response when the initiation response is sent to its destination.

In some aspects, the network token may be hound to a device (e.g., chip component, client device) and an application server or may be hound the device, an App ID, and an application server.

Figure 19:
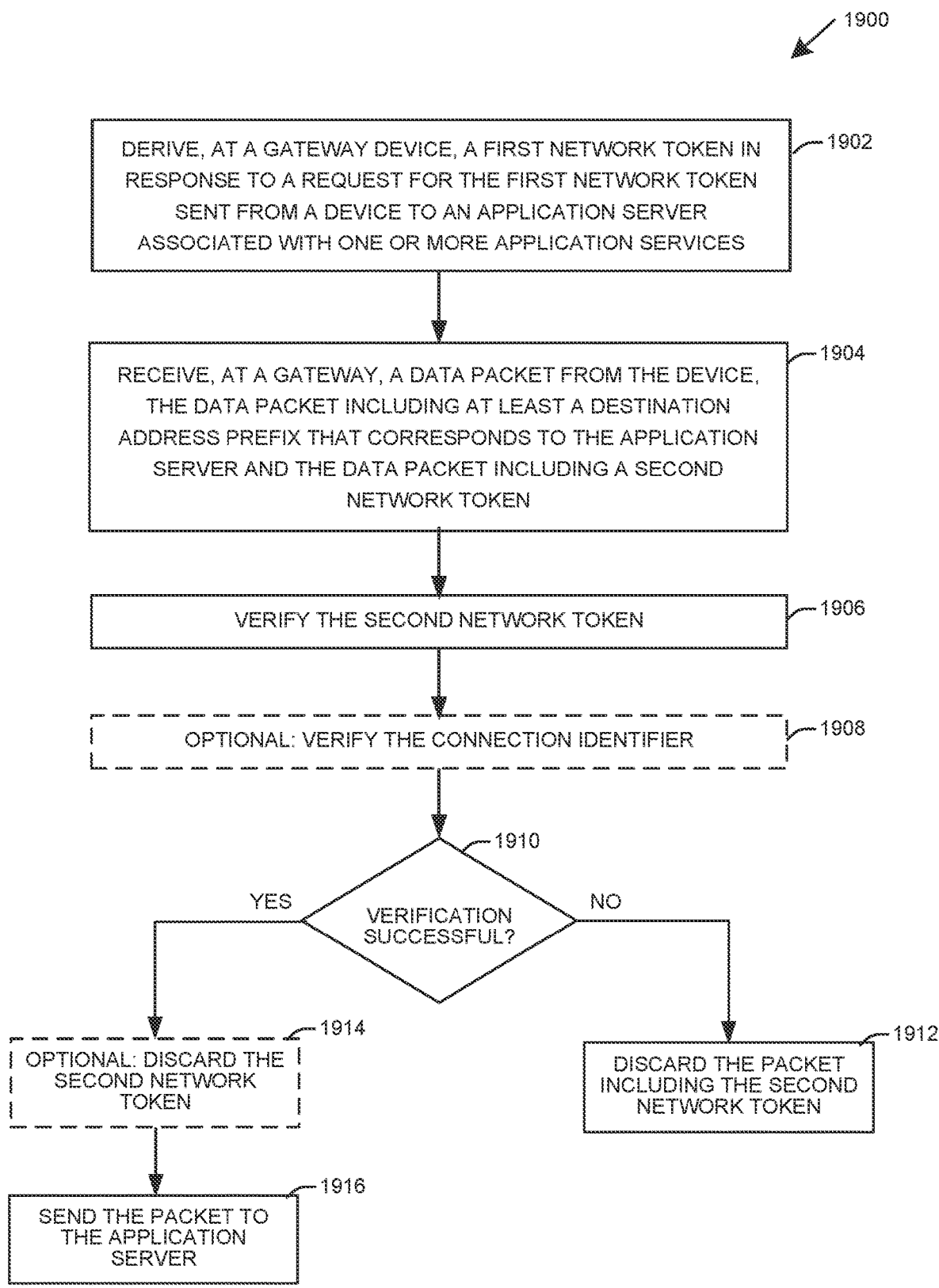
FIG. 19 illustrates an exemplary method operational at a gateway device (e.g., a P-GW) for verifying a network token (e.g., verification of the network token), in connection with use of the network token for enforcement of network policies and/or steering of packets in accordance with an aspect described herein.

FIG. 19 illustrates an exemplary method 1900 operational at a gateway device (e.g., a P-GW) for verifying a network token, in connection with use of the network token for enforcement of network policies and/or steering of packets in accordance with an aspect described herein. According to some aspects, certain features may indicate that the gateway device may be able to use a network token included with the data packet for policy enforcement and/or packet steering. In one example, a flag may be set to indicate that the packet includes a network token for policy enforcement and/or packet steering.

According to one aspect, the method may include deriving 1902, at the gateway device, a first network token in response to a request for the first network token. The request for the first network token may be sent from a device to an application server associated with one or more application services. Receiving 1904, at the gateway device, a data packet from the device. The data packet may include at least a destination address prefix that corresponds to the application server. The data packet may include a second network token.

The method may proceed by verifying 1906 the second network token. According to one aspect, verifying 1906 the second network token may include deriving a duplicate of the first network token from a first function using input parameters obtained from the packet and a key known to the gateway device. The first network token was previously derived and sent to the application server for subsequent delivery to the device. Once the device received the first network token, it included a copy of the first network token with uplink packets sent to the same application server. The second network token, including in the received uplink packet now under consideration, should be a copy of the first network token. The second network token will be identical to the duplicate of the first network token if both network tokens were derived using the same function, the same secret key known to the gateway device, and the same common parameters drawn from different packets sent to the gateway device from the same device.

Optionally, if a connection identifier was derived and stored at the gateway device in connection with the derivation of the original network token, a circuit/module/function at the gateway device may verify 1908 the connection identifier.

A determination 1910 may be made as to whether the verification (e.g., of the second network token and optionally the connection identifier) is successful. If verification is not successful, the method may proceed by discarding 1912 the packet and its associated second network token. If verification is successful, the method may proceed by optionally discarding 1914 the second network token and sending 1916 the packet to the application server.

Exemplary Application Server

Figure 20:
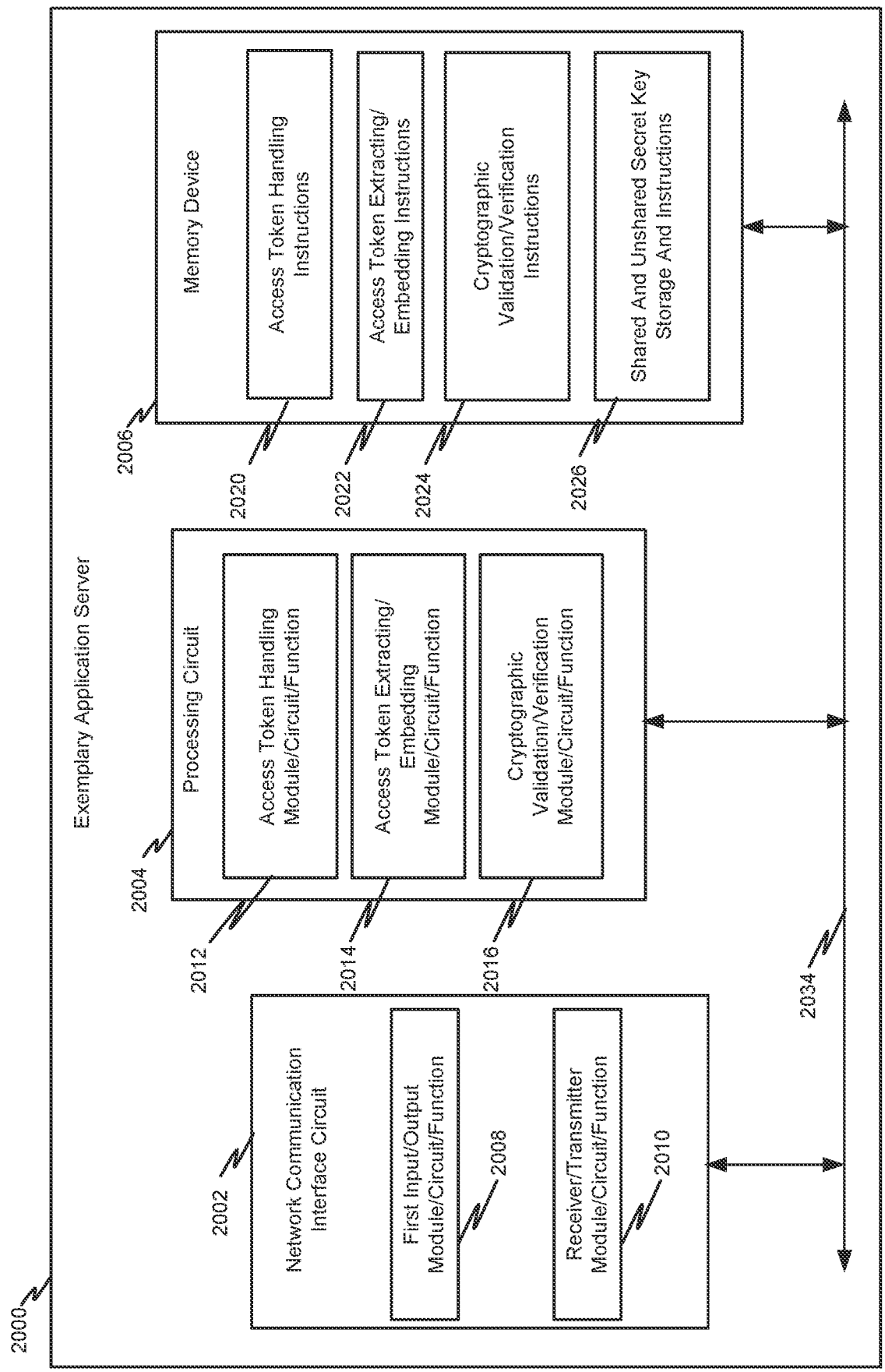
FIG. 20 is a block diagram illustrating an exemplary application server configured to support downlink token validation and packet mapping.

FIG. 20 is a block diagram illustrating an exemplary application server 2000 configured to support downlink token validation and packet mapping. In one example, the application server 2000 may include a network communication interface circuit 2002 for communicating over a wireless network, a processing circuit 2004 coupled to the network communication interface circuit 2002, and a memory device 2006 coupled to the processing circuit 2004. This list is non-limiting.

The network communication interface circuit 2002 for communicating over the wireless network may include a first input/output module/circuit/function 2008 for communication with a P-GW via an S-GW. The network communication interface circuit 2002 may include a receiver/transmitter module/circuit/function 2010 for wireless communication with devices. This list is non-limiting.

The processing circuit 2004 may include or implement one or more processors, application specific processors, hardware and/or software modules, etc., that are configured to support token based application access. For example, a network token handling module/circuit/function 2012 may be configured to derive tokens based on an unshared secret key, or a shared secret key, that may be stored in the memory device 2006. By way of another example, a network token extracting/embedding module/circuit function 2014 may be configured to extract network tokens from uplink packets from a device and/or embed (include) network tokens in packets forwarded to a gateway device. By way of still another example, a cryptographic validation/verification memory device 2016 may be configured to validate/verify network tokens received, for example, from devices. This list is non-limiting.

The memory device 2006 may be configured to include network token handling instructions 2020, network token extracting/embedding instructions 2022, cryptographic validation/verification instructions 2024, and shared and unshared secret key storage and instructions 2026. This list is non-limiting.

Communication between network communication interface circuit 2002, processing circuit 2004, memory device 2006, and other components (not shown) of application server 2000 may be through a communication bus 2034.

Method Operational at an Application Server

Figure 21:
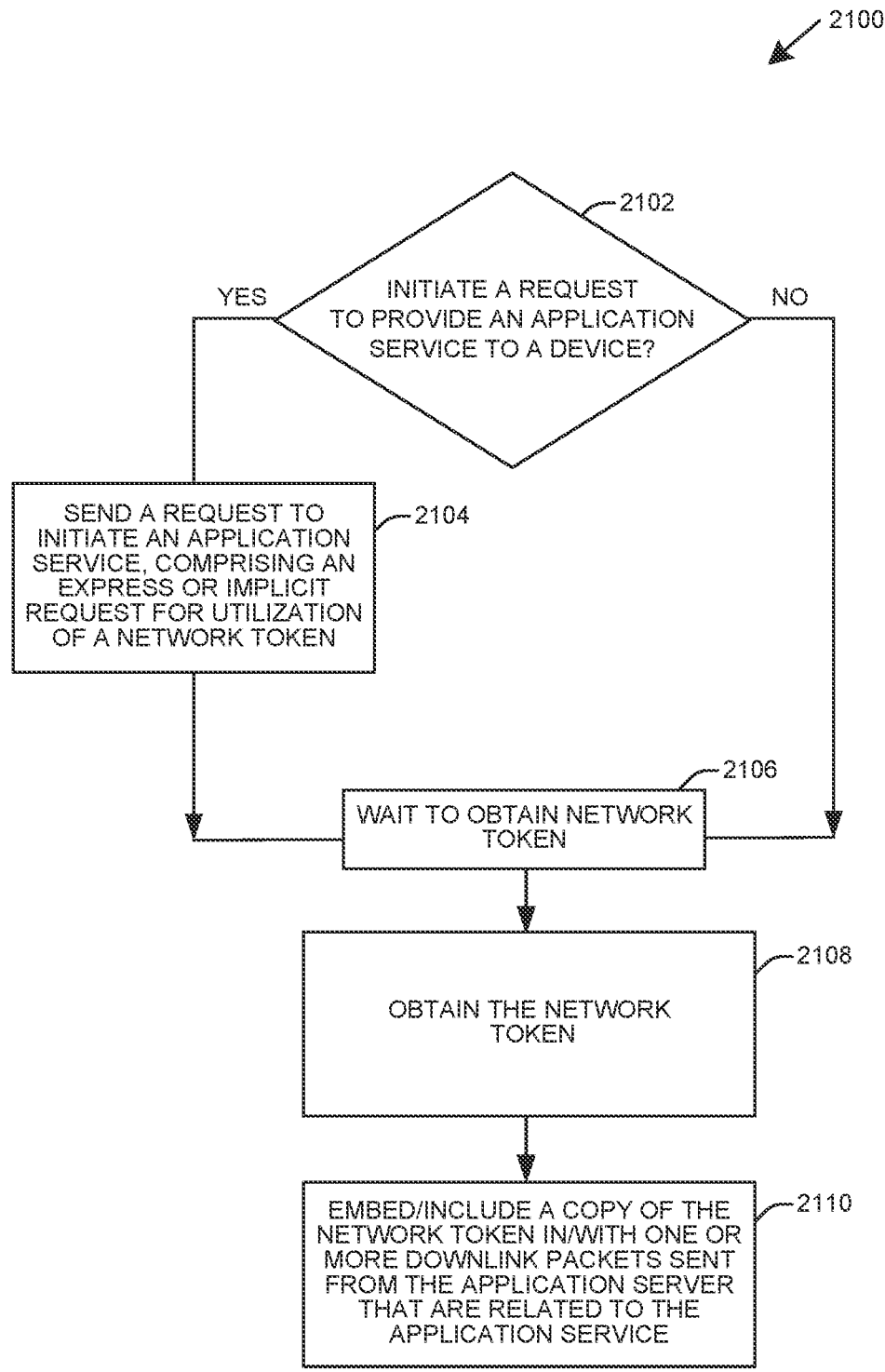
FIG. 21 is a flowchart of an exemplary method of setting up a network token at an application server in accordance with an aspect described herein

FIG. 21 is a flowchart of an exemplary method 2100 of setting up a network token at an application server in accordance with an aspect described herein.

According to one aspect, a determination 2102 may be made as to whether the application server will initiate a request to provide an application service to a device (e.g., chip component, client device). If the application server will initiate the request, the application server may send 2104 the request, comprising a packet transmitted in the user-plane that explicitly includes, or implicitly represents, a request for utilization of a network token (e.g., a DL network token). The application server may then wait 2106 to obtain the network token. Returning to 2102, if it is determined that the application server will not initiate the request, then the application server may wait 2106 to obtain a network token sent, for example, based on an explicit or implicit request for use of a network token sent from a device (e.g., chip component, client device).

The application server may next obtain 2108 the network token. According to aspects described herein, a gateway device associated with a core network may have derived the network token based on a device subscription profile maintained by the core network. The device subscription profile may be stored in a subscription profile repository (SPR). The SPR may be coupled to a PCRF. The network token may reflect a policy enforced by the core network with respect to the device. In other words, the network token need not reflect a policy of the application server. The network token may be derived and used by the gateway device on behalf of the network and for purposes of the network.

Upon obtaining (e.g., receiving) the network token, where, for example, the network token is a DL network token related to a connection with device, the application server may embed, or otherwise include, a copy of the DL network token in at least some packets sent to the device. In some aspects, the application server may embed, or otherwise include, a copy of the DL network token in every packet sent to the device.

In some aspects, sending DL tokens with packets sent from an application server to a device may comprise including the DL token in: an Internet Protocol (IP) IP version 4 (IPv4) header or IP version 6 (IPv6) header, where the token in an IPv4 header may be in an IP Options Field and the token in the IPv6 header may be in an IP extension header; a Transmission Control Protocol (TCP) header; a Secure Socket Layer (SSL) header; a Transport Layer Security (TLS) record header; a shim header between an Internet Protocol (IP) header and a Transmission Control Protocol/User Datagram Protocol (TCP/UDP) header; and/or a Hypertext Transfer Protocol (HTTP) header.

In one aspect, where the DL token was requested by the application server, the DL token may be obtained from a packet comprising a response sent from the device. In another aspect, the DL token may be obtained from a request to initiate an application service sent from the device.

Specific implementations shown and described are only examples and should not be construed as the only way to implement the present disclosure unless specified otherwise herein. It is readily apparent to one of ordinary skill in the art that the various examples in the present disclosure may be practiced by numerous other partitioning solutions.

One or more of the components, acts, features and/or functions described herein and illustrated in the drawings may be rearranged and/or combined into a single component, act, feature, or function or embodied in several components, acts, features, or functions. Additional elements, components, acts, and/or functions may also be added without departing from the invention. The algorithms described herein may also be efficiently implemented in software and/or embedded in hardware.

In the description, elements, circuits, functions, and modules may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It is readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

In addition, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Those of ordinary skill in the art would understand that information and signals may be represented using any of a variety of different technologies and techniques. For example, data, instructions, commands, information, signals, bits, symbols, and chips that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals, including a single data signal.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium," "computer-readable medium," and/or "processor-readable medium" may include, but are not limited to non-transitory mediums such as portable or fixed storage devices, optical storage devices, and various other mediums capable of storing, containing, or carrying instruction(s) and/or data. Thus, the various methods described herein may be fully or partially implemented by instructions and/or data that may be stored in a "machine-readable medium," "computer-readable medium," and/or "processor-readable medium" and executed by one or more processors, machines and/or devices.

Furthermore, embodiments may be implemented by hardware, software, firmware, middleware, microcode, or any combination thereof. When implemented in software, firmware, middleware, or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or information, data, arguments, parameters, or memory contents. Information, arguments, parameters, data, etc. may be passed, forwarded, or transmitted via any suitable means including memory sharing, message passing, token passing, network transmission, traffic, etc.

The various illustrative logical blocks, elements, circuits, modules, functions, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration. A general-purpose processor, configured for executing embodiments described herein, is considered a special purpose processor for carrying out such embodiments. Similarly, a general-purpose computer is considered a special purpose computer when configured for carrying out embodiments described herein.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, circuits, functions, modules, and algorithm steps described in connection with the embodiments disclosed herein may be implemented as electronic hardware, computer software, or combinations of both. To clearly illustrate this interchangeability of hardware and software, various illustrative elements, components, blocks, circuits, functions, modules, and steps have been described above generally in terms of their functionality. Whether such functionality is implemented as hardware, software, or a combination thereof depends upon the particular application and design selections imposed on the overall system.

The various features of the invention described herein can be implemented in different systems without departing from the invention. It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

What is claimed is:

1. A method, operational at an application server, comprising:
    sending, by the application server, a request to initiate a first application service with a device;
    obtaining, in response to sending the request to initiate the first application service, a network token, wherein the network token is:
        associated with a first data flow of a set of one or more data flows,
        associated with the first application service, and
        sent to the device via one or more user-plane messages; and
    sending the network token with one or more downlink packets sent from the application server to the device in the user-plane,
    wherein the network token is derived by a gateway device of a core network.

2. The method of claim 1, wherein the network token is based on a device subscription profile of the device and/or a policy of the first application service.

3. The method of claim 1, wherein the network token reflects a policy enforced by a core network with respect to the device.

4. The method of claim 1, wherein the request to initiate the first application service includes an explicit request for the network token.

5. The method of claim 1, wherein sending the request to initiate the first application service includes sending a packet representative of an implicit request for the network token.

6. The method of claim 1, wherein the application server is associated with one or more application services.

7. The method of claim 1, wherein sending the network token with the one or more downlink packets comprises including the network token in every downlink packet sent from the application server to the device in the user-plane.

8. An application server, comprising:
means for sending, by the application server, a request to initiate a first application service with a device;
means for obtaining, in response to sending the request to initiate the first application service, a network token, wherein the network token is:
associated with a first data flow of a set of one or more data flows,
associated with the first application service, and
sent to the device via one or more user-plane messages; and
means for sending the network token with one or more downlink packets sent from the application server to the device in the user-plane,
wherein the network token is derived by a gateway device of a core network.

9. The application server of claim 8, wherein the network token is based on a device subscription profile of the device and/or a policy of the first application service.

10. The application server of claim 8, wherein the network token reflects a policy enforced by a core network with respect to the device.

11. The application server of claim 8, wherein the request to initiate the first application service includes an explicit request for the network token.

12. The application server of claim 8, wherein sending the request to initiate the first application service includes sending a packet representative of an implicit request for the network token.

13. An application server, comprising:
a memory; and
a processor, wherein the memory and the processor are configured to:
send, by the application server, a request to initiate a first application service with a device;
obtain, in response to sending the request to initiate the first application service, a network token, wherein the network token is:
associated with a first data flow of a set of one or more data flows,
associated with the first application service, and
sent to the device via one or more user-plane messages; and
send the network token with one or more downlink packets sent from the application server to the device in the user-plane,
wherein the network token is derived by a gateway device of a core network.

14. The application server of claim 13, wherein the network token is based on a device subscription profile of the device and/or a policy of the first application service.

15. The application server of claim 13, wherein the network token reflects a policy enforced by a core network with respect to the device.

16. The application server of claim 13, wherein the request to initiate the first application service includes an explicit request for the network token.

17. The application server of claim 13, wherein sending the request to initiate the first application service includes sending a packet representative of an implicit request for the network token.

* * * * *